(12) United States Patent
Aio et al.

(10) Patent No.: US 11,689,992 B2
(45) Date of Patent: Jun. 27, 2023

(54) COMMUNICATION APPARATUS AND COMMUNICATION METHOD

(71) Applicant: SONY CORPORATION, Tokyo (JP)

(72) Inventors: Kosuke Aio, Tokyo (JP); Shigeru Sugaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 15/734,376

(22) PCT Filed: May 29, 2019

(86) PCT No.: PCT/JP2019/021196
§ 371 (c)(1),
(2) Date: Dec. 2, 2020

(87) PCT Pub. No.: WO2019/239886
PCT Pub. Date: Dec. 19, 2019

(65) Prior Publication Data
US 2021/0195505 A1    Jun. 24, 2021

(30) Foreign Application Priority Data
Jun. 11, 2018   (JP) ................................. 2018-110785

(51) Int. Cl.
*H04W 4/00* (2018.01)
*H04W 48/16* (2009.01)
(Continued)

(52) U.S. Cl.
CPC .......... *H04W 48/16* (2013.01); *H04W 48/14* (2013.01); *H04W 84/12* (2013.01)

(58) Field of Classification Search
CPC ..... H04W 48/14; H04W 48/16; H04W 28/04; H04W 88/08; H04W 72/04; H04W 72/042
(Continued)

(56) References Cited

U.S. PATENT DOCUMENTS 9,814,085 B2 * 11/2017 Cherian ................. H04L 63/10
2005/0111419 A1   5/2005 Kwon et al.
(Continued)

FOREIGN PATENT DOCUMENTS

CN    104770020 A    7/2015
JP    2007-306510 A    11/2007
(Continued)

OTHER PUBLICATIONS

International Search Report and Written Opinion of PCT Application No. PCT/JP2019/021196, dated Jul. 30, 2019, 21 pages of ISRWO.

*Primary Examiner* — Temica M Beamer
(74) *Attorney, Agent, or Firm* — Chip Law Group

(57) ABSTRACT

The present technology relates to a communication apparatus and a communication method for performing wireless communication more efficiently. There is provided a communication apparatus acting as a wireless base station including a control section that acquires, from another wireless base station, information related to configuration information regarding the other wireless base station. On the basis of the information related to the configuration information regarding the other wireless base station, the control section performs control to generate sharing verification information indicating whether or not the configuration information regarding the other wireless base station has a commonality with the wireless base station. The control section further performs control to transmit the sharing verification information to the other wireless base station. The present technology may be applied to wireless LAN systems, for example.

20 Claims, 19 Drawing Sheets

(51) Int. Cl.
*H04W 48/14* (2009.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 2008/0299966 A1 | 12/2008 | Masuda |
| 2014/0126563 A1 | 5/2014 | Chen et al. |
| 2018/0132175 A1* | 5/2018 | Choi ................. H04W 72/0446 |
| 2018/0368195 A1 | 12/2018 | Sugaya |

FOREIGN PATENT DOCUMENTS

| | | |
|---|---|---|
| JP | 2015-535155 A | 12/2015 |
| JP | 2017-022459 A | 1/2017 |
| JP | 2017-118250 A | 6/2017 |
| KR | 10-2015-0082393 A | 7/2015 |
| WO | 2007/094056 A1 | 8/2007 |
| WO | 2014/071845 A1 | 5/2014 |

\* cited by examiner

FIG. 7

| Order | CONFIGURATION INFORMATION | Common flag | |
|---|---|---|---|
| | | SAME SSID | OTHERS |
| 1 | Timestamp | No | No |
| 2 | Beacon interval | Yes | No |
| 3 | Capability Information | Yes | Yes |
| 4 | SSID | Yes | No |
| 5 | Supported Rates and BSS Membership Selectors | Yes | Yes |
| 6 | DSSS Parameter Set | Unknown | Unknown |
| ... | ... | ... | ... |

FIG. 12

```
START
  ↓
S201 RECEIVE MULTIPLEXING INFORMATION FRAME FROM ANOTHER AP
  ↓
S202 DOES INFORMATION IN COMMON FLAG INFORMATION MATCH WITH INFORMATION IN OWN COMMON CONFIGURATION INFORMATION LIST?
  ├─ YES → S203 WAIT FOR RANDOMLY DETERMINED PERIOD OF TIME BEFORE TRANSMITTING Ack TO TRANSMISSION SOURCE → END
  └─ NO → S204 EXTRACT EACH UNMATCHED CONFIGURATION INFORMATION
              ↓
              S205 UPDATE Common Flag
              ↓
              S206 WAIT FOR RANDOMLY DETERMINED PERIOD OF TIME BEFORE TRANSMITTING MULTIPLEXING INFORMATION FRAME TO TRANSMISSION SOURCE
              ↓
              END
```

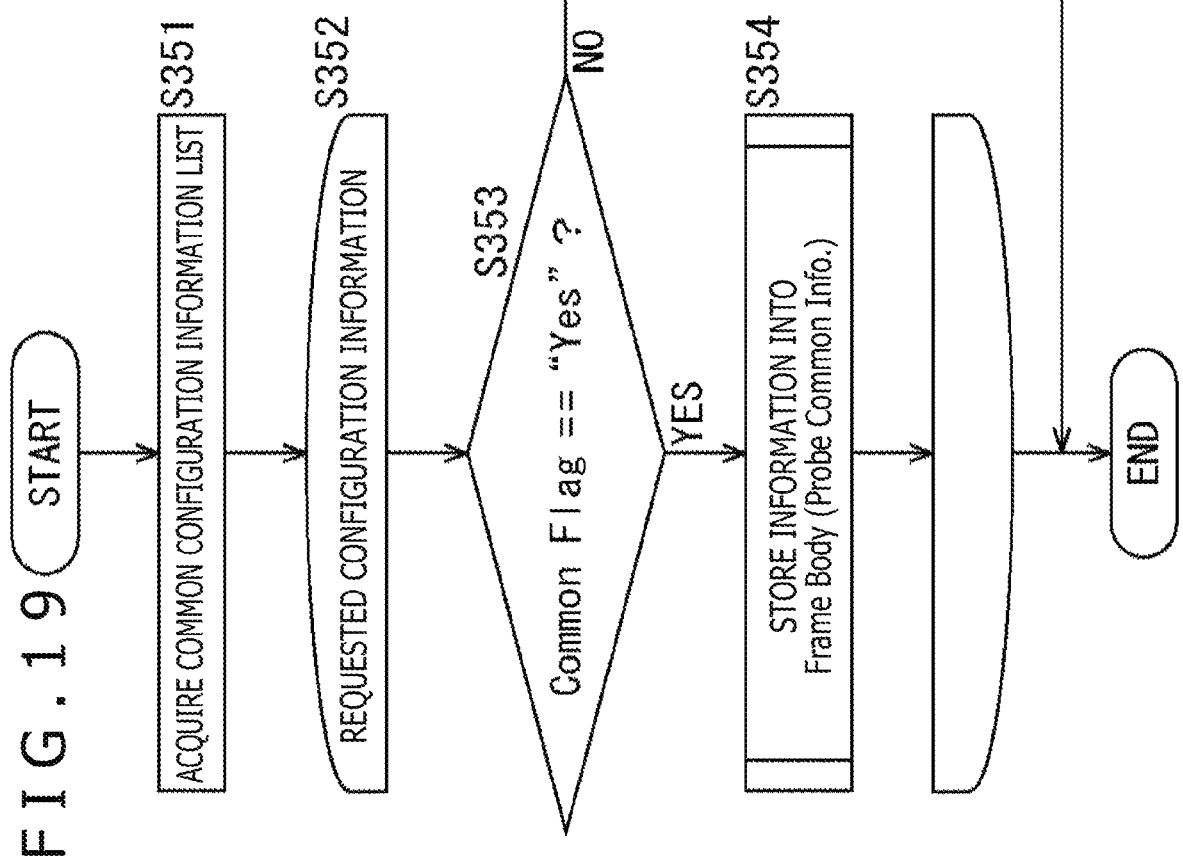

COMMUNICATION APPARATUS AND COMMUNICATION METHOD

CROSS REFERENCE TO RELATED APPLICATIONS

This application is a U.S. National Phase of International Patent Application No. PCT/JP2019/021196 filed on May 29, 2019, which claims priority benefit of Japanese Patent Application No. JP 2018-110785 filed in the Japan Patent Office on Jun. 11, 2018. Each of the above-referenced applications is hereby incorporated herein by reference in its entirety.

TECHNICAL FIELD

The present technology relates to a communication apparatus and a communication method. More particularly, the technology relates to a communication apparatus and a communication method for performing wireless communication with higher efficiency.

BACKGROUND ART

In recent years, there have been increasing use cases in which multiple wireless base stations (base stations) are set up indoors such as in the office or home in order to expand wireless LAN (Local Area Network) services. That means a wireless terminal that starts to offer wireless LAN services is required to select an optimal wireless base station from among the multiple wireless base stations being present.

Further, it is preferred that the wireless terminal presumably using wireless LAN services while on the move, such as a smartphone, a tablet terminal, or a laptop personal computer switches the connection likewise from one optimal wireless base station to another on site so as to maintain uninterrupted wireless communication.

There is a disclosed technology for establishing the time to be set for a scan through the use of learning information from the wireless terminal in the case where the active scan method is adopted when using wireless LAN services (e.g., see PTL 1).

CITATION LIST

Patent Literature

[PTL 1]
Japanese Patent Laid-open No. 2007-306510

SUMMARY

Technical Problem

However, the technology disclosed in PTL 1 requires learning wireless communication and cannot be used for initialization, which leaves the technology considered less than efficient. There has been a need for techniques for carrying out more efficient wireless communication.

The present technology has been devised under the above circumstances and is aimed at performing wireless communication with higher efficiency.

Solution to Problem

According to a first aspect of the present technology, there is provided a communication apparatus acting as a wireless base station including a control section configured to acquire, from another wireless base station, information related to configuration information regarding the other wireless base station. On the basis of the information related to the configuration information regarding the other wireless base station, the control section performs control to generate sharing verification information indicating whether or not the configuration information regarding the other wireless base station has a commonality with the wireless base station. The control section performs control to transmit the sharing verification information to the other wireless base station.

According to the first aspect of the present technology, there is provided a communication method for use with a communication apparatus of a wireless base station, the communication method including causing the communication apparatus to acquire, from another wireless base station, information related to configuration information regarding the other wireless base station; on the basis of the information related to the configuration information regarding the other wireless base station, causing the communication apparatus to generate sharing verification information indicating whether or not the configuration information regarding the other wireless base station has a commonality with the wireless base station; and causing the communication apparatus to transmit the sharing verification information to the other wireless base station.

With the communication apparatus and the communication method according to the first aspect of the present technology, information related to configuration information regarding another wireless base station is acquired from the other wireless base station. On the basis of the information related to the configuration information regarding the other wireless base station, sharing verification information is generated to indicate whether or not the configuration information regarding the other wireless base station has a commonality with the wireless base station. The sharing verification information is transmitted to the other wireless base station.

According to a second aspect of the present technology, there is provided a communication apparatus acting as a wireless terminal, the communication apparatus including a control section configured to perform control to transmit a request signal to a wireless base station, the request signal including multiplexing information related to multiplexing of a response signal responding to the request signal.

According to the second aspect of the present technology, there is provided a communication method for use with a communication apparatus of a wireless terminal, the communication method including causing the communication apparatus to perform control to transmit a request signal to a wireless base station, the request signal including multiplexing information related to multiplexing of a response signal responding to the request signal.

With the communication apparatus and the communication method according to the second aspect of the present technology, a request signal is transmitted to a wireless base station, the request signal including multiplexing information related to multiplexing of a response signal responding to the request signal.

The communication apparatus according to the first and the second aspects of the present technology may be an independent apparatus or may be an internal block or blocks constituting a single apparatus.

Advantageous Effect of Invention

According to the first and the second aspects of the present technology, wireless communication is performed more efficiently.

Note that the advantageous effects outlined above are not limitative of the present disclosure; further advantages will become apparent from a reading of the present disclosure.

BRIEF DESCRIPTION OF DRAWINGS

FIG. 7 is a view depicting an example of a common configuration information list.

FIG. 12 is a flowchart explaining a flow of a multiplexing information negotiation phase.

FIG. 19 is a flowchart explaining a flow of the process of generating a multiplexed probe response.

DESCRIPTION OF EMBODIMENT

A preferred embodiment of the present technology is described below with reference to the accompanying drawings. Note that the description will be given in the following order.
1. Embodiment of the present technology
2. Alternative example 1. Embodiment of the Present Technology Configuration Example of the Wireless Communication System FIG. 1 is a view depicting a configuration example of a wireless communication system.

Figure 1:
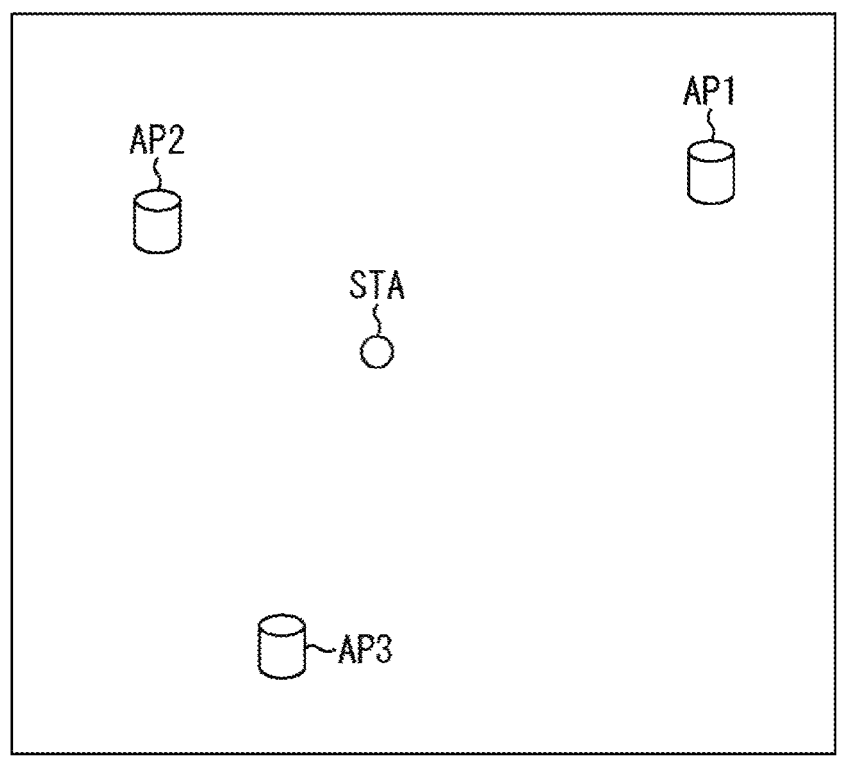
FIG. 1 is a view depicting a configuration example of a wireless communication system.

In FIG. 1, the wireless communication system is a wireless LAN (Local Area Network) system configured with multiple networks (BSS: Basic Service Set) each including wireless base stations (AP: Access Point) and a wireless terminal (STA: Station) connected therewith.

FIG. 1 depicts a case where three wireless base stations AP1 to AP3 are set up in a home along with one wireless terminal STA. The wireless base station AP1 operates a network BSS1. Likewise, the wireless base stations AP2 and AP3 operate networks BSS2 and BSS3, respectively. In this case, the wireless terminal STA may be connected to any one of the networks BSS1 to BSS3 operated by the wireless base stations AP1 to AP3.

Incidentally, the configuration of the wireless communication system depicted in FIG. 1 is an example and not limitative of how the system is to be configured. There need only be multiple connected communication apparatuses (wireless base stations AP) each having a communication apparatus (wireless terminal STA) as a terminal present in the vicinity. As along as these apparatuses meet the conditions depicted in FIG. 1, they may have any positional relations therebetween.

Configuration Example of the Communication Apparatus

Figure 2:
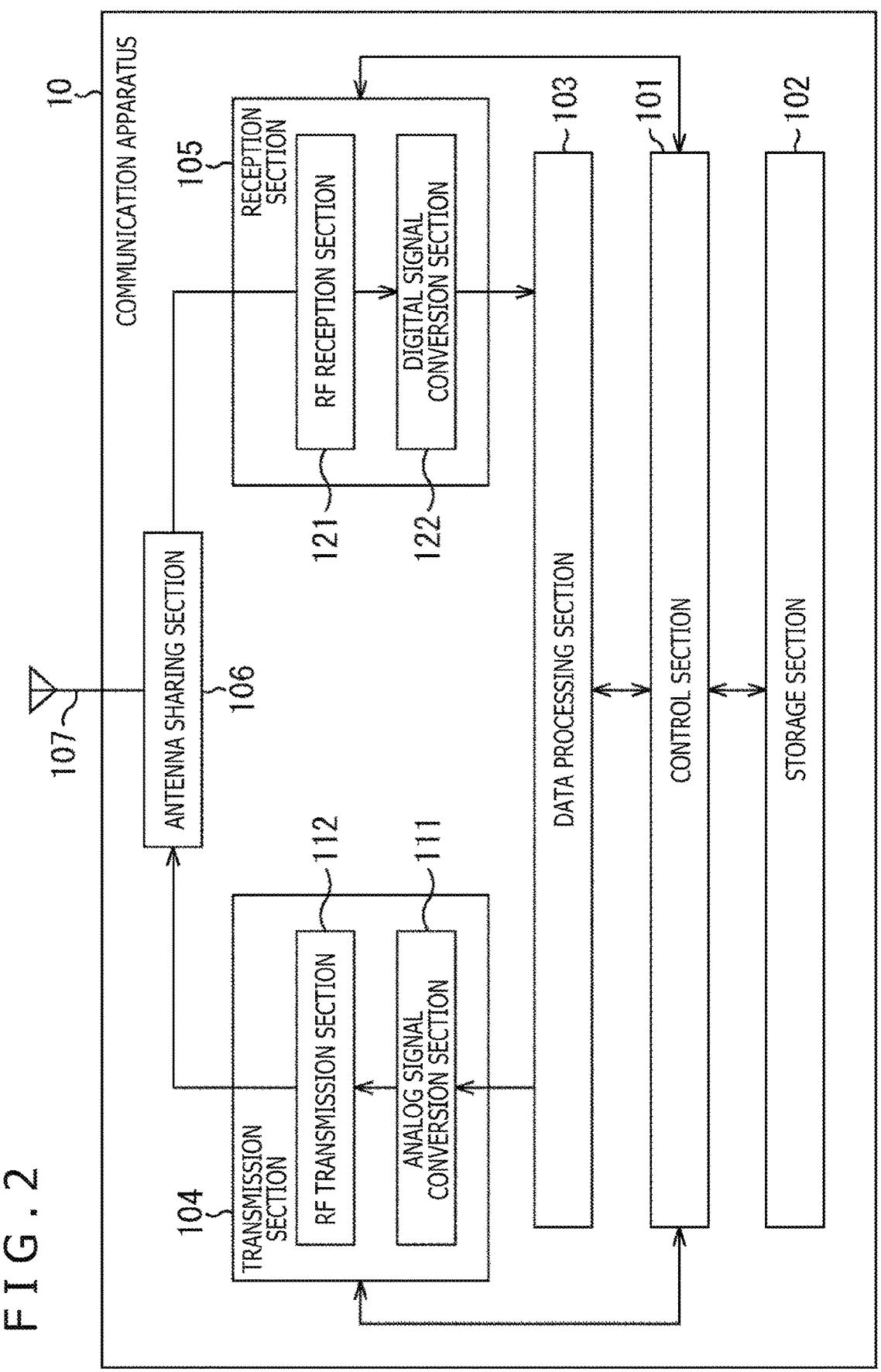
FIG. 2 is a block diagram depicting a configuration example of an embodiment of a communication apparatus to which the present technology is applied.

FIG. 2 is a block diagram depicting a configuration example of an embodiment of a communication apparatus (wireless communication apparatus) to which the present technology is applied.

A communication apparatus 10 depicted in FIG. 2 is configured as a wireless base station AP or as a wireless terminal STA in the wireless communication system of FIG. 1.

In FIG. 2, the communication apparatus 10 includes a control section 101, a storage section 102, a data processing section 103, a transmission section 104, a reception section 105, and an antenna sharing section 106. The communication apparatus 10 is also provided with an antenna 107 for the antenna sharing section 106.

The control section 101 includes a processor such as a microprocessor that controls the operations of blocks constituting the communication apparatus 10. The control section 101 further transfers information (data) between the blocks.

For example, the control section 101 controls the transmission section 104 to perform processes such as adjustment and determination of transmission parameters. In another example, the control section 101 controls the reception section 105 to carry out processes such as adjustment and determination of reception parameters.

The storage section 102 includes a semiconductor memory such as a nonvolatile memory or a volatile memory. Under control of the control section 101, the storage section 102 stores diverse kinds of data.

For example, in the case where the communication apparatus 10 is a wireless base station AP, the storage section 102 may store necessary signal transmission status and signal reception status such as the reception power of beacons transmitted from other wireless base stations AP. The storage section 102 may further store a common configuration information list, to be discussed later.

Under control of the control section 101, the data processing section 103 performs data processing on the data (signals) to be communicated. Specifically, at the time of transmission, for example, the data processing section 103 generates transmission data to be transmitted in packets, and supplies the generated data to the transmission section 104. At the time of reception, for example, the data processing section 103 extracts reception data from a reception signal supplied from the reception section 105.

Under control of the control section 101, the transmission section 104 generates a transmission signal from the transmission data supplied from the data processing section 103. The transmission section 104 supplies the generated transmission signal to the antenna sharing section 106.

The transmission section 104 includes an analog signal conversion section 111 and an RF transmission section 112. The analog signal conversion section 111 converts transmission data from digital to analog format and supplies the resulting analog signal to the RF transmission section 112. The RF transmission section 112 generates a transmission signal by performing processes such as frequency conversion and power amplification on the analog signal supplied from the analog signal conversion section 111.

Here, in the case where the communication apparatus 10 is a wireless base station AP, the transmission section 104 may generate the transmission signal using a frequency band (RU: Resource Unit) designated by the control section 101.

At the time of transmission, the antenna sharing section 106 emits the transmission signal via the antenna 107 as an electromagnetic wave, the transmission signal being supplied from the transmission section 104 (from the RF transmission section 112 therein). At the time of reception, the antenna sharing section 106 supplies the reception section 105 with a reception signal received as an electromagnetic wave via the antenna 107.

Under control of the control section 101, the reception section 105 extracts reception data from the reception signal supplied from the antenna sharing section 106. The reception section 105 supplies the extracted reception data to the data processing section 103.

The reception section 105 includes an RF reception section 121 and a digital signal conversion section 122. The RF reception section 121 converts the reception signal to a digital-ready analog signal by performing processes such as frequency conversion and power amplification on the reception signal, and supplies the resulting analog signal to the digital signal conversion section 122. Note that an LNA (Low Noise Amplifier) included in the RF reception section 121 controls the gain of the reception intensity using AGC (Auto Gain Control). The digital signal conversion section 122 converts the analog signal supplied from the RF reception section 121 from analog to digital format, and supplies the resulting digital signal to the data processing section 103.

The communication apparatus 10 configured as described above is provided as a wireless base station AP (or as a wireless terminal STA) in the wireless communication system in FIG. 1. In order to perform wireless communication with higher efficiency, the control section 101 may include features such as those explained below. That is, as will be discussed later in more detail, the control section 101 controls the operations of the configured blocks in such a manner as to carry out highly efficient active scans by transmitting a multiplexed probe response on the basis of a common configuration information list shared by the wireless base stations AP.

(Overview of the Present Technology)

Meanwhile, in utilizing wireless LAN services, the wireless terminal STA selects an optimal wireless base station from among multiple wireless base stations AP being present. While on the move, the wireless terminal STA switches the connection from one optimal wireless base station to another on site so as to maintain uninterrupted wireless communication.

In order to implement such operations, the wireless terminal STA is required to perform a fast scan over the networks BS in the vicinity. For example, the IEEE 802.11 standard for the PHY/MAC layers of wireless LANs stipulates two scan methods: a passive scan method and an active scan method.

The passive scan method involves obtaining information necessary for the connection from beacon signals (beacons) transmitted periodically from wireless base stations AP. The active scan method, on the other hand, involves having a request signal (probe request) transmitted from the wireless terminal STA to the wireless base stations AP so as to acquire diverse information in the form of response signals (probe responses) from the base stations AP.

According to the passive scan method, the wireless terminal STA is required to wait for a beacon to be transmitted from a wireless base station AP. In order to search for a connection destination at higher speed, it is desired to use the active scan method that causes the request signal to be transmitted from the wireless terminal STA.

However, according to the active scan method, it is necessary to wait for a certain period of time to receive signals from multiple wireless base stations AP. There is fear that information may not be collected efficiently from the wireless base stations AP depending on the wait time being set. Thus, there has been a need for making the active scan method more efficient.

For example, the above-mentioned PTL 1 discloses a method of setting the scan-related time through the use of learning information from the wireless terminal. The method disclosed in PTL 1 requires learning for a certain period of time at the same location. That means the method cannot be used for initialization, for example. The present technology aims to implement a highly efficient active scan method that can also be used for initialization without requiring learning from the wireless terminal.

Figure 3:
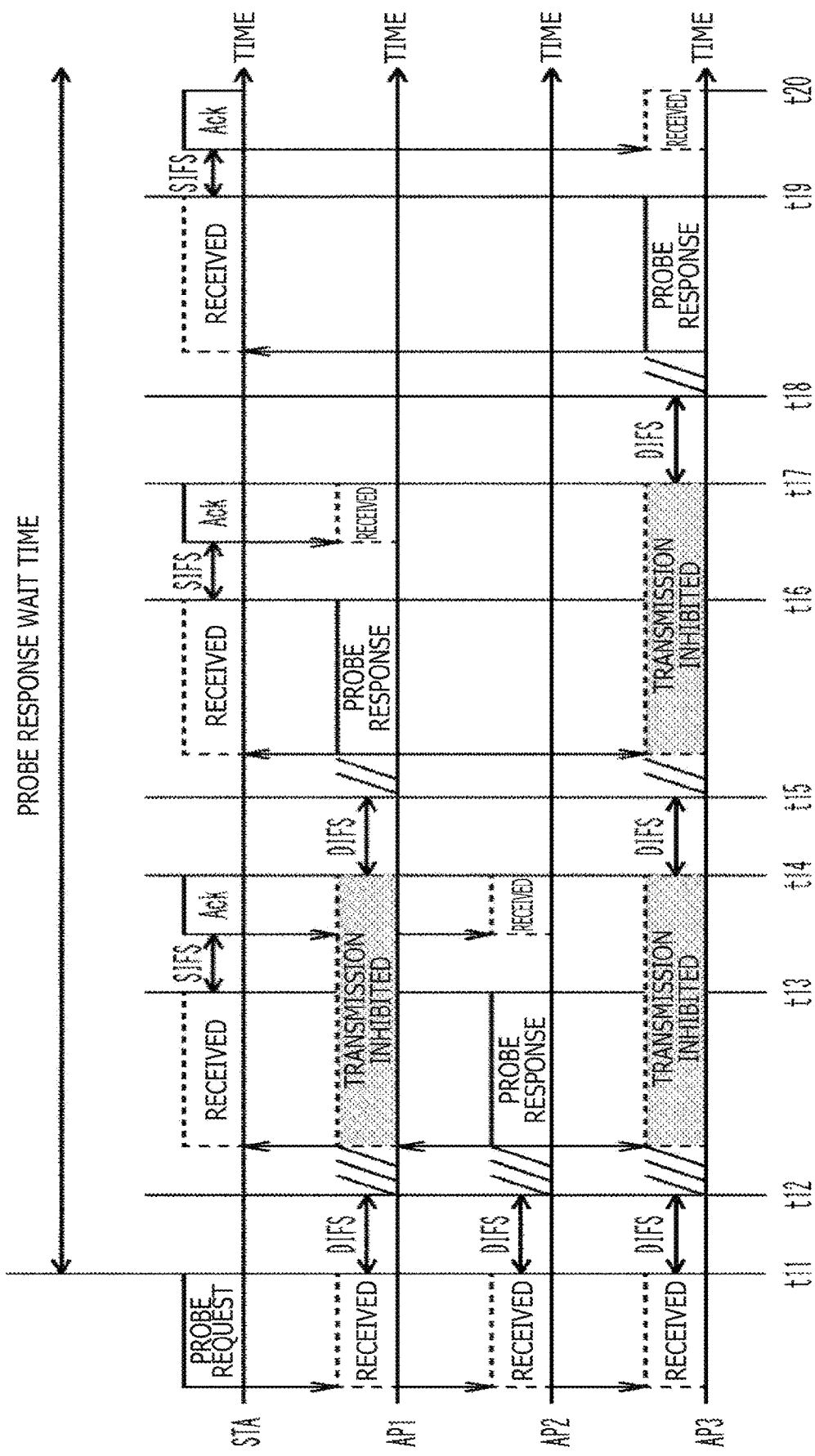
FIG. 3 is a view outlining the active scan method.

FIG. 3 is a view outlining the active scan method. Note that, in FIG. 3, the left-to-right direction represents the direction of time.

By the active scan method, the wireless terminal STA first transmits a probe request to the wireless base stations AP in the vicinity. Upon receipt of the probe request, each of the wireless base stations AP transmits a probe response to the wireless terminal STA. At this time, each wireless base station AP counts down a randomly set time to start transmitting the probe response at the count "zero" so that the communication does not conflict (coincide) with that of the other wireless base stations AP.

If a wireless base station AP in a wait state finds that another wireless base station AP is transmitting a probe response, the wireless base station AP suspends its countdown until the transmission of the probe response by the other wireless base station AP comes to an end. Following the wait for the probe response transmission to come to an end, the wireless base station AP resumes the countdown.

More specifically, as depicted in FIG. 3, in the case where the wireless terminal STA transmits a probe request to each of the wireless base stations AP1, AP2, and AP3, the wireless base station AP2 from among the three base stations transmits a probe response to the wireless terminal STA at time t12 through time t14. During the transmission, the wireless base stations AP1 and AP3 are in a wait state, with the wireless base station AP2 excluded.

Thereafter, at time t15 through time t17, the wireless base station AP1 out of the remaining two base stations AP1 and AP3 transmits a probe response to the wireless terminal STA, with the wireless base station AP2 excluded. During the transmission, the wireless base station AP3 is in a wait state. At time t18 through time 20, the remaining wireless base station AP3 transmits a probe response to the wireless terminal STA, with the wireless base stations AP1 and AP2 excluded.

Note that, in FIG. 3, a reference sign DIFS (DCF Inter Frame Space) indicates that a given wireless base station waits for a certain period of time after another wireless base station AP has transmitted data. A reference sign SIFS (Short Inter Frame Space) indicates that in the case where the wireless terminal STA has correctly received the data destined therefor, the wireless terminal STA waits for a predetermined period of time before transmitting a response (Ack: Acknowledgement).

As described above, the larger the number of wireless base stations AP are in the vicinity of the wireless terminal STA, the longer it takes for the wireless terminal STA to process the scan. Furthermore, in the case where there is no knowing how many wireless base stations AP are in the vicinity, the wireless terminal STA is required to set a prolonged time period in which a probe response (probe response wait time) is waited for. That means more time is needed for the scan.

Figure 4:
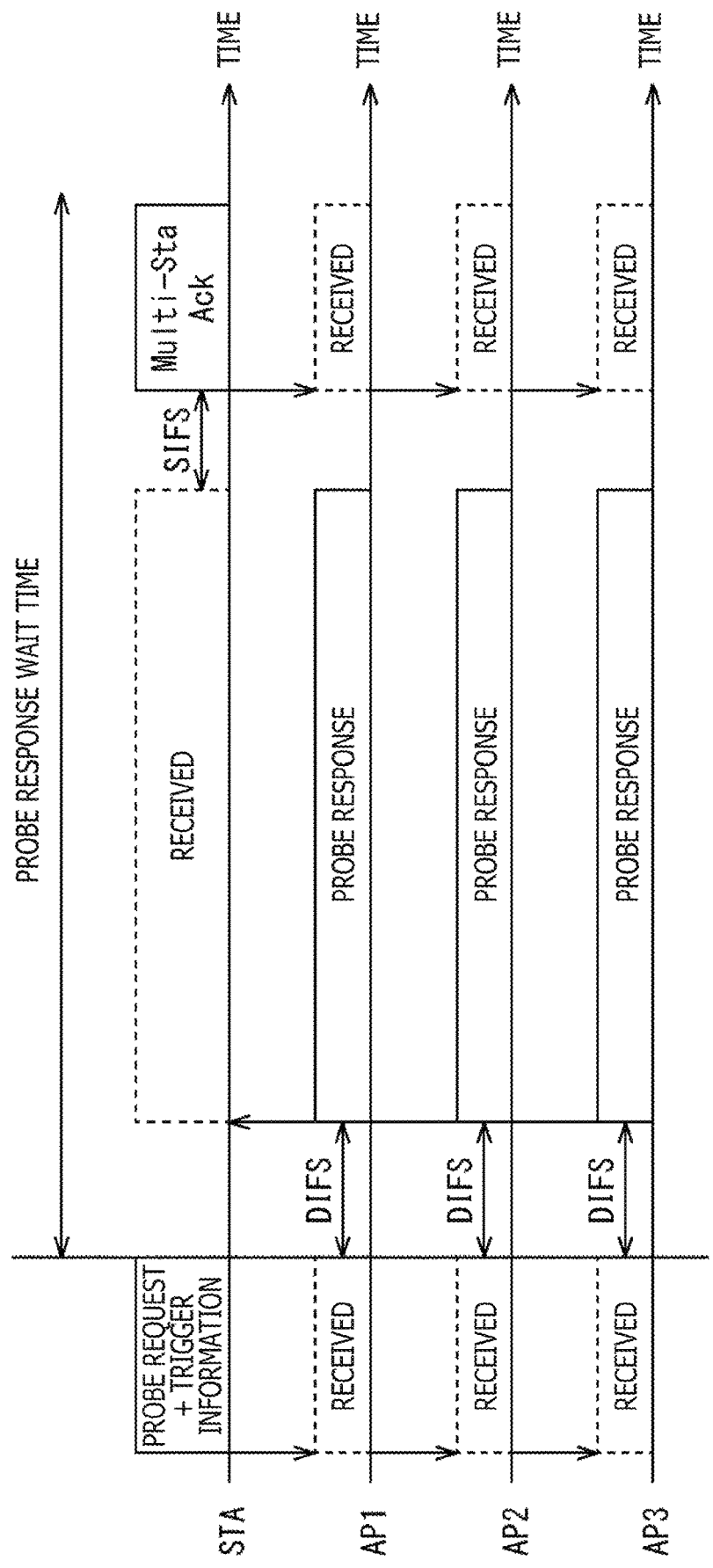
FIG. 4 is a view depicting an example of multiplex communication of probe responses.

In view of the above, there is envisaged a method that involves frequency-multiplexing probe responses from multiple wireless base stations AP and transmitting the frequency-multiplexed probe responses in order to shorten the processing time of the active scan method. FIG. 4 depicts an example of multiplex communication of probe responses.

In FIG. 4, upon transmitting a probe request to the wireless base stations AP in the vicinity, the wireless terminal STA adds a frame to the request for notification purpose, the frame including information regarding signal multiplexing (trigger information). Upon receipt of the probe request, the wireless base station AP may select a frequency band, based on the information included in the received trigger information with regard to signal multiplexing, before transmitting a probe response in the selected frequency band.

More specifically, as depicted in FIG. 4, the wireless terminal STA transmits the probe request including the trigger information to each of the wireless base stations AP1, AP2, and AP3. In this case, upon receipt of the probe request, the wireless base stations AP1, AP2, and AP3 frequency-multiplex their probe responses on the basis of the trigger information and transmit the frequency-multiplexed probe responses simultaneously to the wireless terminal STA. This allows the wireless terminal STA to receive simultaneously the probe responses from the wireless base stations AP1, AP2, and AP3. Consequently, the wireless terminal can shorten the probe response wait time and thereby reduce the active scan time.

This method related to frequency multiplexing is based on the technology adopted by IEEE 802.11ax currently being standardized. IEEE 802.11ax grants only one wireless base station AP means to let multiple wireless terminals STA perform frequency multiplexing. The literature cited below discloses technology for allowing wireless base stations AP to exchange multiplexing information therebetween.

Literature: Japanese Patent Laid-open No. 2017-22459

However, in the case where there is no knowing how many wireless base stations AP are in the vicinity of the wireless terminal STA, the band for use in probe responses cannot be designated by the wireless terminal STA. The band needs to be designated by the wireless base stations AP. In this case, the wireless terminal STA narrows the band for probe response (signal) transmission as much as possible in order to reduce the probability of conflicting with the bands used by the wireless base stations AP in the vicinity.

Figure 5:
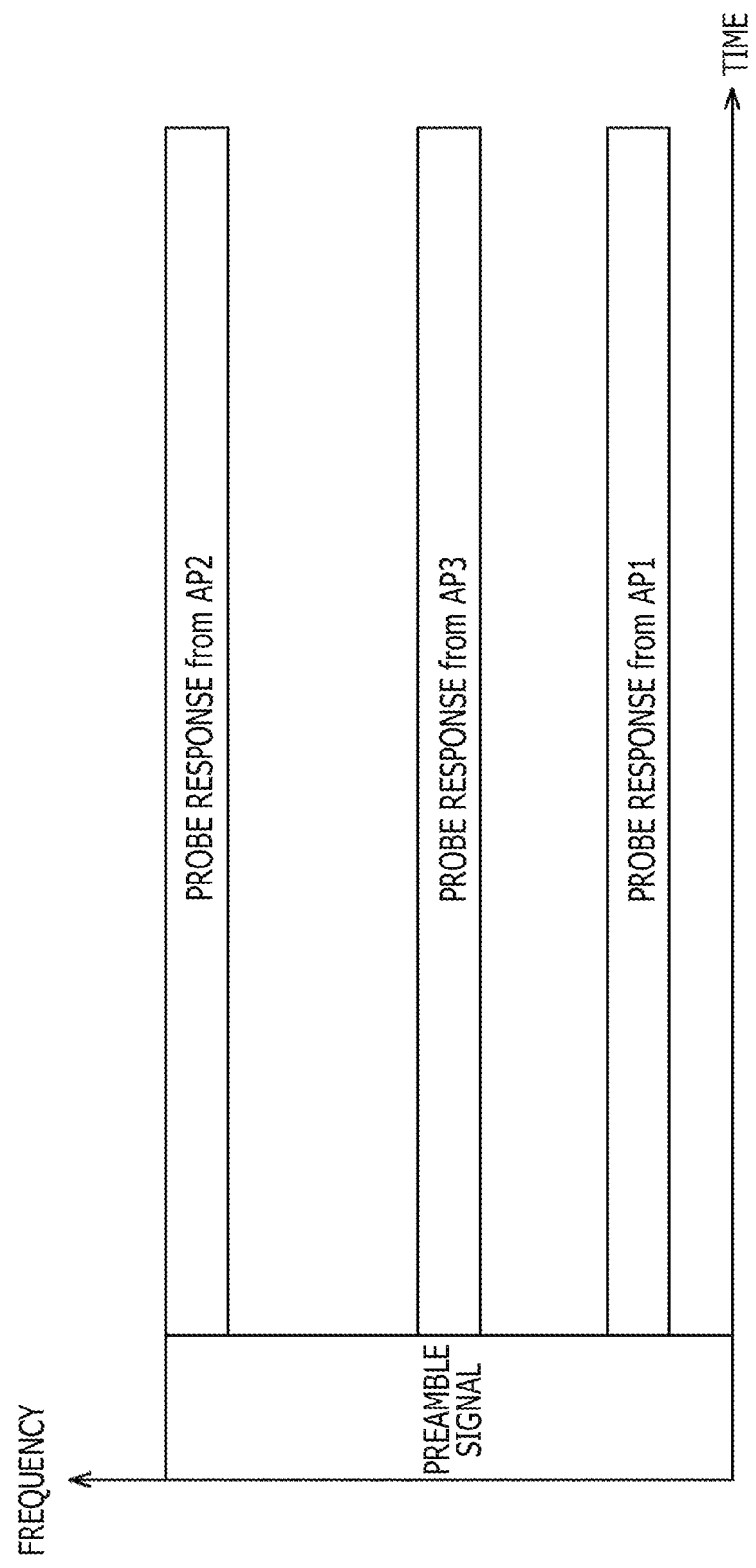
FIG. 5 is a view depicting an example of multiplex communication of probe responses performed by use of a narrow band.

FIG. 5 depicts an example of multiplex communication of probe responses performed by use of a narrow band. Note that, in FIG. 5, the left-to-right direction represents the direction of time, and the bottom-up direction denotes the magnitude of frequency.

Here, if the band is excessively narrowed for probe response transmission as depicted in FIG. 5, it takes more time to transmit a single probe response. There is fear that the processing time for active scans may not be effectively reduced as expected.

That is, what is transmitted in FIG. 5 includes a preamble signal common to all wireless base stations AP and probe responses from the wireless base stations AP1, AP2, and AP3. Since the probe response from each wireless base station AP is transmitted in a narrow band, it is expected that the processing time for active scans is not effectively reduced.

For cases in which the wireless terminal STA causes multiple wireless base stations AP to perform frequency division multiplex communication, the present technology proposes the method of implementing highly efficient active scans by determining a transmission band for use in frequency multiplexing on the basis of a previously generated (prepared) list (common configuration information list, to be discussed later).

Figure 6:
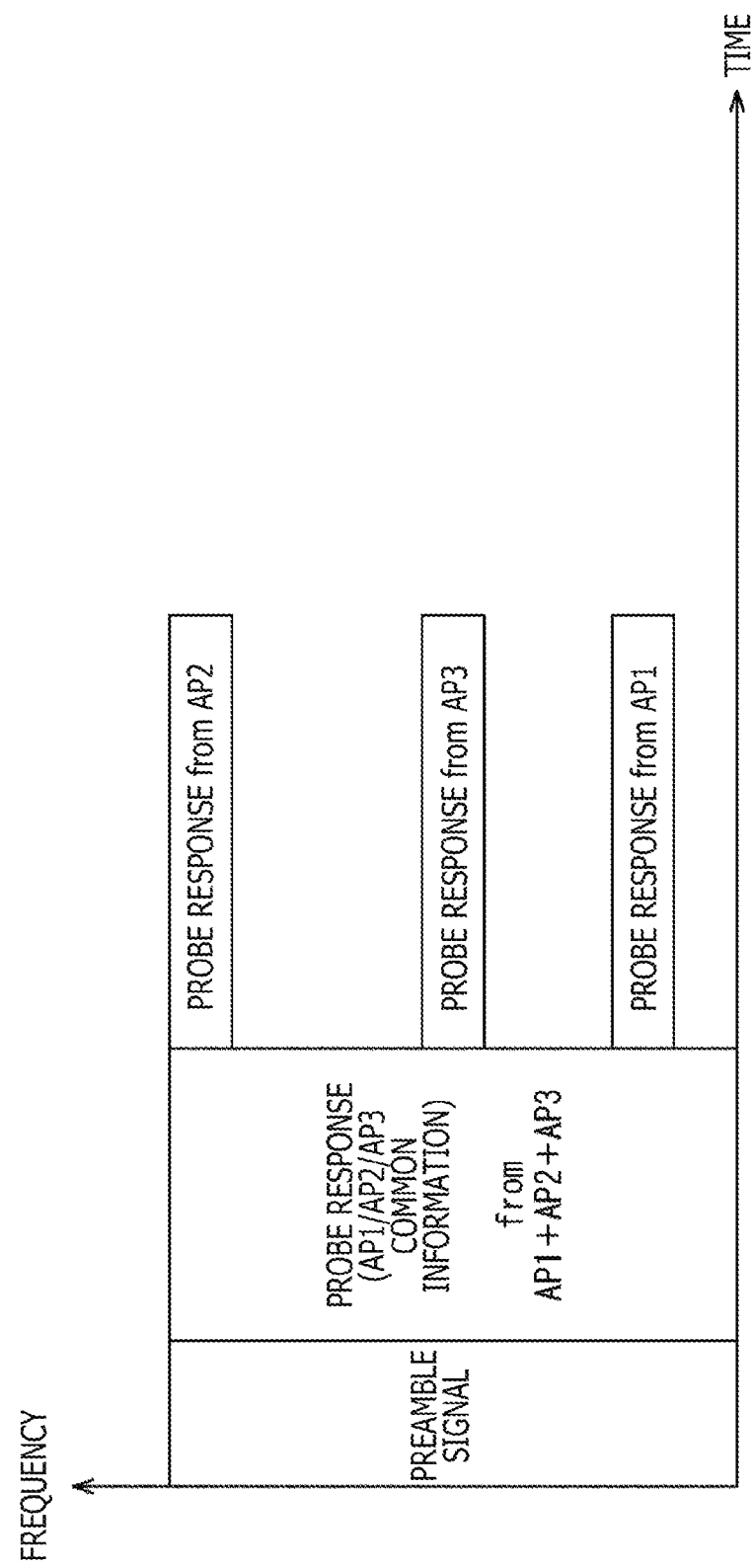
FIG. 6 is a view depicting an example of the probe response multiplex communication to which the present technology is applied.

FIG. 6 depicts an example of the probe response multiplex communication to which the present technology is applied. The probe response multiplex communication to which this technology is applied involves transmitting probe responses using a wide band in the case of concurrently sending information common to the wireless base stations AP in the vicinity (the information will be referred to as the common information hereunder). In this case, the wireless terminal STA receives probe responses (signals) in a manner overlapping with one another from multiple wireless base stations. If the information transmitted from each of the wireless base stations AP is all identical, the signals can be decoded without interference with each other.

Meanwhile, the probe response multiplex communication to which the present technology is applied uses a narrow band in a case where each wireless base station transmits information different from that of the other wireless base stations in the vicinity (the non-common information will be referred to as the unique information hereunder). In this case, the wireless terminal STA can separately receive and decode the probe responses (signals) because they are transmitted from the wireless base stations AP in different frequency bands.

In FIG. 6, as described above, the common information and the other information (unique information) are separately handled in the multiplex communication of probe responses by use of a wide band and a narrow band. Compared with the existing method (FIG. 5) of having all information transmitted in a narrow band, the transmission time is shortened, and the time required to do active scans is reduced correspondingly.

Note that the wide band (broadband) as a first band means it is wider than the narrow band (narrow band) as a second band. As long as the first band (e.g., 20 to 40 MHz) is wider than the second band (e.g., 2 MHz) upon comparison in terms of relations therebetween (the second band is narrower than the first band), the first and the second bands may each be assigned a desired band. In the first band, the same band is assigned to all wireless base stations AP, and in the second band, a different band is assigned (randomly) to each wireless base station AP.

(Example of the Common Configuration Information List)

Here, the determination of whether or not given information has a commonality with the wireless base stations AP is performed by each wireless base station AP on the basis of a list (hereinafter, called the common configuration information list) prepared collectively beforehand by the wireless base stations AP in the vicinity. FIG. 7 depicts an example of the common configuration information list. The common configuration information list may also be said to be common configuration information determination information used by a given wireless base station AP to determine whether or not given configuration information has a commonality with the other wireless base stations AP.

In FIG. 7, the information that may be transmitted by use of a probe response is referred to as the configuration information. That is, the common configuration information list includes four patterns of information, "Yes," "No," "Unknown," and "Initial," with respect to various kinds of configuration information. The four patterns of information are distinguished from one another by a two-bit common flag.

For example, of the sets of configuration information requested by a probe request, the configuration information with its common flag set to "Yes" has a commonality with the wireless base stations in the vicinity and thus can be transmitted by use of the wide band. The configuration information with its common flag set to other than "Yes" is different from the wireless base stations AP in the vicinity and thus can be transmitted by use of the narrow band. That is, the common flag may also be said to be information regarding the configuration information in the common configuration information list for the wireless base stations AP.

Alternatively, the common configuration information list may be generated in predetermined units, e.g., in units of an SSID (Service Set Identifier) or in units of an established group. FIG. 7 indicates that the common configuration information list is generated for the same SSID and for each of other settings (for specific groups).

For example, configuration information "Timestamp" is set with "No" and "No" as common flags (for the same SSID and for the others, in that order); "Beacon interval" is set with "Yes" and "No"; and "Capability Information" is set with "Yes" and "Yes." Further, configuration information "SSID" is set with "Yes" and "No"; "Supported Rates and BSS Membership Selectors" is set with "Yes" and "No"; and "DSSS Parameter SET" is set with "Unknown" and "Unknown," for example.

Here, in a case where wireless base station products are used in the office, for example, the information such as "Capability Information" is presumed to be approximately the same for all the products as common information. In a case where different products of wireless base stations are introduced in the home, for example, there presumably exist multiple sets of common information, such as support for IEEE 802.11n, support for IEEE 802.11ac, and usable frequency bands.

On the other hand, the information unique to each wireless base station AP such as a MAC (Media Access Control address) address and Timestamp needs to be communicated individually. Such information is handled not as the common information but as the unique information.

(Example of Overall Sequence)

Figure 8:
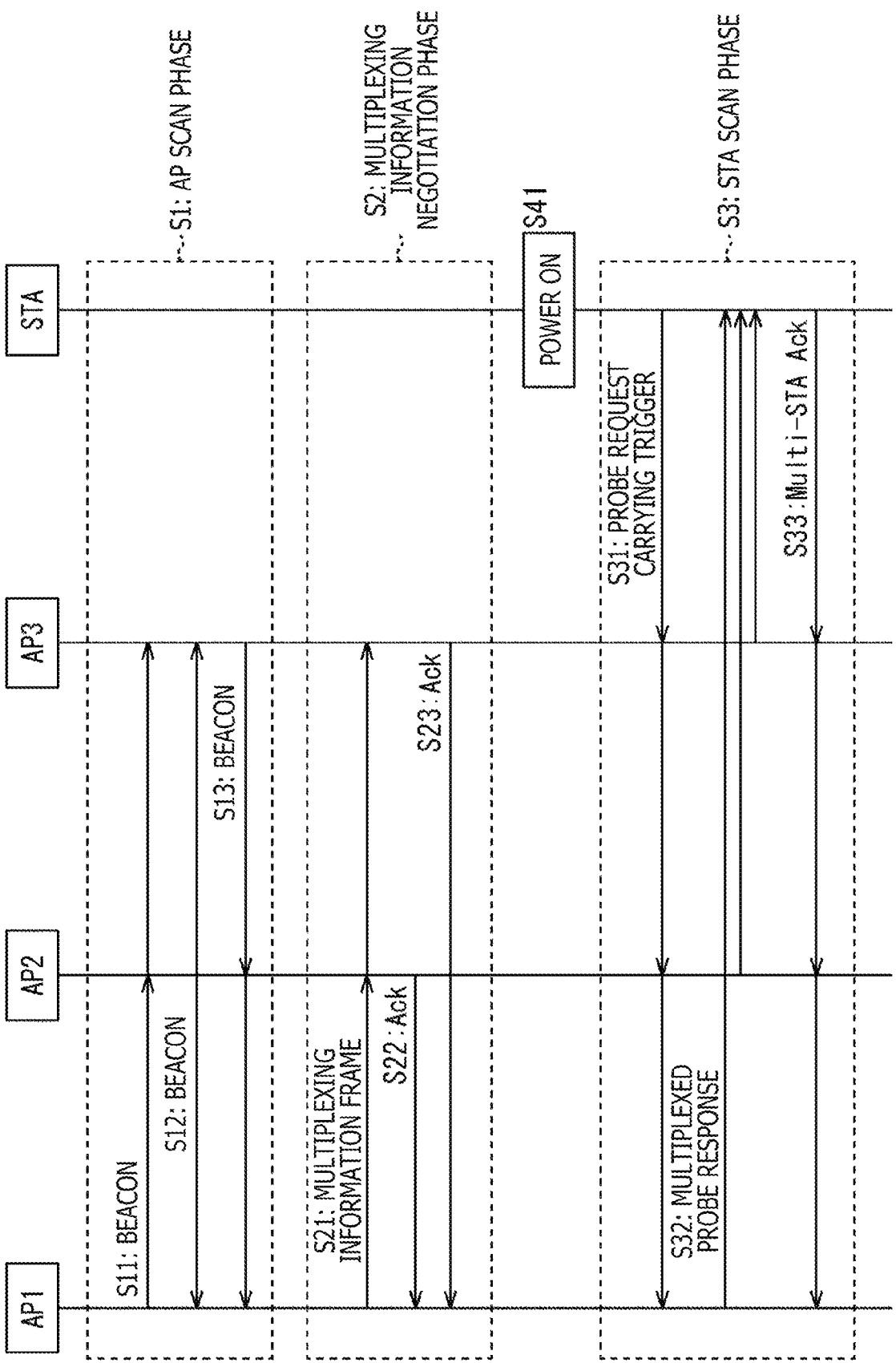
FIG. 8 is a view depicting an example of overall sequence.

FIG. 8 is a view depicting an example of overall sequence according to the present technology.

In FIG. 8, if the flow of processes to which the present technology is applied is depicted in an overall sequence, the process flow may be divided into three phases: an AP scan phase (S1), a multiplexing information negotiation phase (S2), and an STA scan phase (S3).

The AP scan phase (S1) is a phase in which each wireless base station AP updates (or generates) the common configuration information list it retains, on the basis of beacons (notification signals) from the other wireless base stations AP.

In the AP scan phase (S1), each wireless base station AP (e.g., wireless base station AP1) receives beacons sent from the other wireless base stations AP (e.g., wireless base stations AP2 and AP3) (S11, S12, and S13). Each wireless base station AP updates (or generates) the common configuration information list it retains on the basis of the configuration information included in the received beacons.

Note that the AP scan phase will be discussed later in more detail with reference to FIGS. 9 and 10.

The multiplexing information negotiation phase (S2) is a phase in which it is ascertained whether or not the wireless base stations AP share the common configuration information list generated in the AP scan phase and whether or not the same common configuration information list is retained by the wireless base stations AP.

In the multiplexing information negotiation phase, the wireless base station AP1, for example, generates a multiplexing information frame, and transmits the generated frame to the wireless base stations AP2 and AP3 (S21). As will be discussed later in more detail, the multiplexing information frame includes information regarding the configuration information in the common configuration information list retained by the own station (base station AP).

The wireless base stations AP2 and AP3 receive the multiplexing information frame from the wireless base station AP1. In the case where the wireless base stations AP2 and AP3 retain the same common configuration information list as that of the wireless base station AP1, the wireless base stations AP2 and AP3 transmit responses (Ack) to that effect to the wireless base station AP1 (S22 and S23).

Here, in the example of FIG. 8, the wireless base stations AP2 and AP3 retain the same common configuration information list as that of the wireless base station AP1 and thus transmit Ack to the latter. In the case where the wireless base stations AP2 and AP3 retain a common configuration information list different from that of the wireless base station AP1, the wireless base stations AP2 and AP3 each generate a multiplexing information frame that includes information regarding the configuration information in their common configuration information list. The wireless base stations AP2 and AP3 transmit the generated multiplexing information frames to the wireless base station AP1.

It is assumed that the multiplexing information negotiation phase is performed at predetermined time intervals. Apart from such timing, the multiplexing information negotiation phase may be triggered to be performed when any one of the wireless base stations AP has changed its configuration information or when a new adjacent wireless base station AP is detected, for example.

Note that the multiplexing information negotiation phase will be discussed later in more detail with reference to FIGS. 11 to 15.

The STA scan phase (S3) is a phase in which, in a case where the wireless terminal STA transmits a probe request using the active scan method, the wireless base stations AP transmit probe responses in reply to the request.

It is to be noted here that the wireless terminal STA transmits a trigger-carrying probe request and that the wireless base stations AP transmit multiplexed probe responses in reply to the request. Here, it may be said that the probe request (trigger-carrying probe request) is a request signal and that the probe responses (multiplexed probe response) are a response signal in reply to the request signal.

As will be discussed later in detail, the trigger-carrying probe request includes, besides the probe request, trigger information including such information as the frequency band and transmission power at the time of multiplexed probe responses. In the multiplexed probe responses, the common information regarding the wireless base stations AP is transmitted in a wide band frame and the unique information specific to each wireless base station AP is transmitted in a narrow band frame.

In the STA scan phase, upon turning on power, for example (S41), the wireless terminal STA transmits the trigger-carrying probe request to each of the wireless base stations AP1 to AP3 (S31). On the basis of the trigger-carrying probe request from the wireless terminal STA, the wireless base stations AP1 to AP3 transmit multiplexed probe responses to the wireless terminal STA (S32).

The wireless terminal STA receives the multiplexed probe responses from the wireless base stations AP1 to AP3, and transmits a response (Multi-STA Ack) to each of the wireless base stations AP1 to AP3 in reply (S33).

Note that the STA scan phase will be discussed later in more detail with reference to FIGS. 16 to 19.

According to the present technology, as described above, the operation of wireless LAN services based on the active scan method is implemented using the three phases, i.e., an AP scan phase, a multiplexing information negotiation phase, and an STA scan phase. These phases will be discussed individually below in detail.

(Details of the AP Scan Phase)

Figure 9:
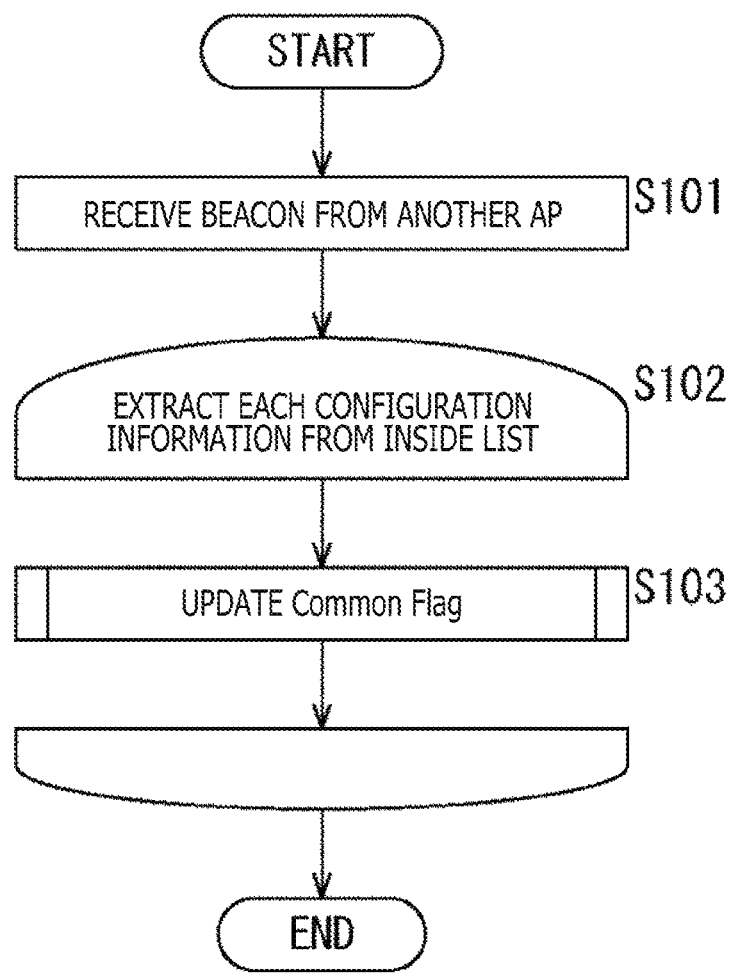
FIG. 9 is a flowchart explaining a flow of an AP scan phase.
Figure 10:
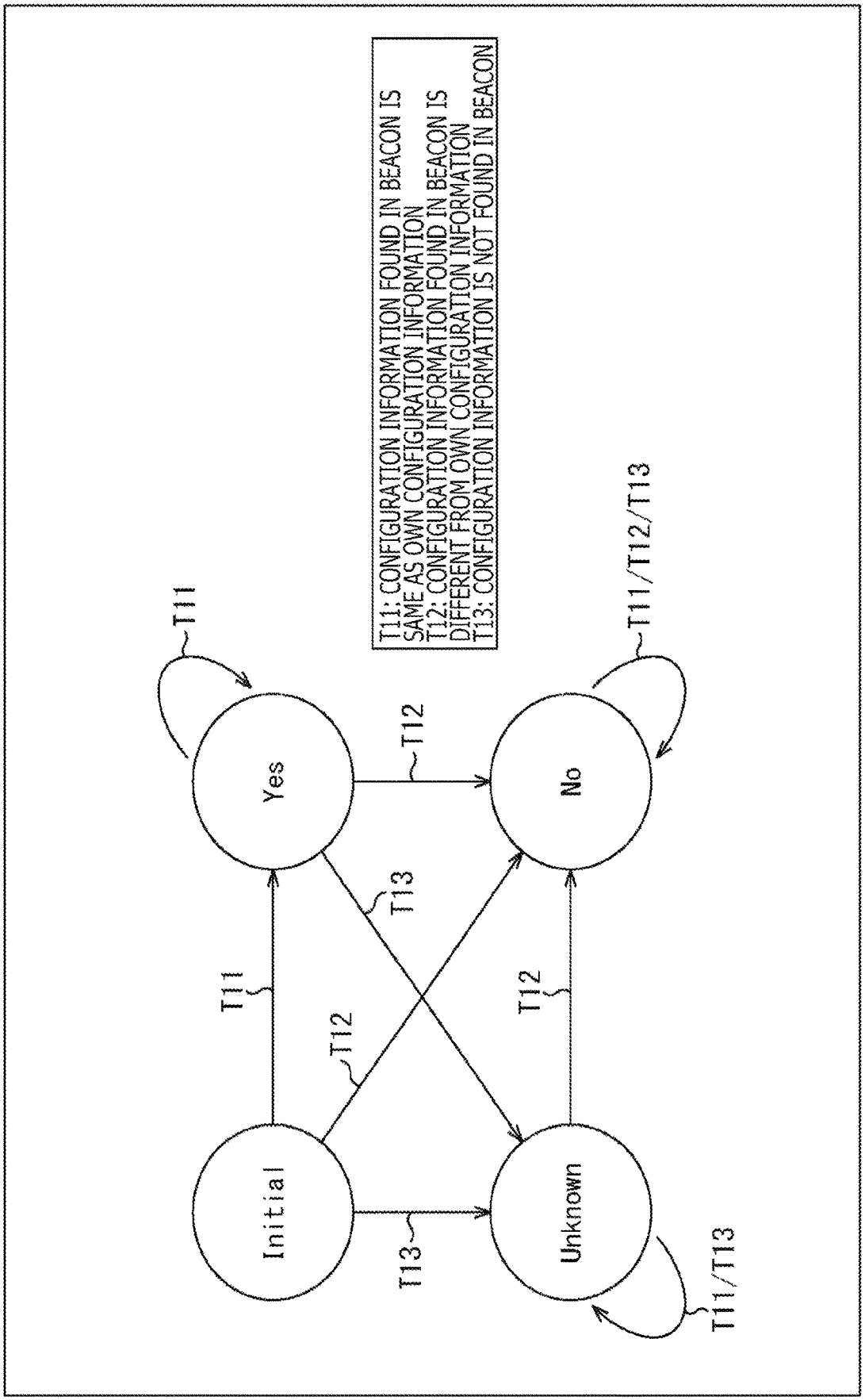
FIG. 10 is a view depicting a state transition diagram of a common flag in the AP scan phase.

First, with reference to FIGS. 9 and 10, the AP scan phase depicted in FIG. 8 is explained in detail.

FIG. 9 is a flowchart explaining a flow of the AP scan phase performed by the communication apparatus 10 serving as a wireless base station AP.

In step S101, the reception section 105 receives a beacon transmitted from another wireless base station AP.

In step S102, on the basis of the configuration information included in the received beacons, the control section 101 extracts various kinds of configuration information from inside the common configuration information list stored in the storage section 102.

In step S103, on the basis of the extracted configuration information, the control section 101 updates the common flag in the common configuration information list stored in the storage section 102.

Here, in the case where the relations between the configuration information (e.g., Timestamp and Beacon interval) included in the beacon received from the other wireless base station AP on one hand and various kinds of configuration information (e.g., Timestamp and Beacon interval) in the common configuration information list on the other hand meet predetermined conditions, the state of the common flag (e.g., "Yes," "No," and "Unknown") regarding the configuration information in the common configuration information list is updated.

Upon completion of the processing of step S103, the AP scan phase depicted in FIG. 9 is terminated.

FIG. 10 depicts a state transition diagram of the common flag in the AP scan phase.

In the AP scan phase, as described above, the two-bit common flag can represent four states, i.e., "Initial," "Yes," "No," and "Unknown."

First, in the case where the state of the common flag is "Initial," when there is configuration information in the beacon from another wireless base station AP, and when the configuration information is the same as the own configuration information, the state of the common flag transitions from "Initial" to "Yes" (T11 indicated by an arrow originating from a circle "Initial" in the drawing). When there is configuration information in the beacon and when the configuration information differs from the own configuration information, the state of the common flag transitions from "Initial" to "No" (T12 indicated by an arrow originating from the circle "Initial" in the drawing).

Note that, in the case where the state of the common flag is "Initial" and where there is no configuration information in the beacon from another wireless base station AP, the state of the common flag transitions from "Initial" to "Unknown" (T13 indicated by an arrow originating from the circle "Initial" in the drawing).

Second, in the case where the state of the common flag is "Yes," where there is configuration information in the beacon from another wireless base station AP, and where the configuration information is the same as the own configuration information, the state of the common flag remains "Yes" (T11 indicated by an arrow originating from a circle "Yes" in the drawing). When there is configuration information in the beacon and when the configuration information differs from the own configuration information, the state of the common flag transitions from "Yes" to "No" (T12 indicated by an arrow originating from the circle "Yes" in the drawing).

Note that, even in the case where the state of the common flag is "Yes," if there is no configuration information in the beacon from another wireless base station AP, the state of the common flag transitions from "Yes" to "Unknown" (T13 indicated by an arrow originating from the circle "Yes" in the drawing).

Third, in the case where the state of the common flag is "No," where there is configuration information in the beacon from another wireless base station AP, and either where the configuration information is the same as or different from the own configuration information or where there is no configuration information in the beacon from another wireless base station AP, the state of the common flag remains "No" (T11, T12, or T13 indicated by an arrow originating from a circle "No" in the drawing).

Fourth, in the case where the state of the common flag is "Unknown," where there is configuration information in the beacon from another wireless base station AP, and either where the configuration information is the same as the own configuration information or where there is no configuration information in the beacon, the state of the common flag remains "Unknown" (T11 or T13 indicated by an arrow originating from a circle "Unknown" in the drawing). When there is configuration information in the beacon and when the configuration information differs from the own configuration information, the state of the common flag transitions from "Unknown" to "No" (T12 indicated by an arrow originating from the circle "Unknown" in the drawing).

Here, in a case where it is assumed that a given wireless base station AP receives the beacons from multiple wireless base stations AP and where at least one of the sets of configuration information coming from these wireless base stations AP and included in the received beacons is detected to be different from the own configuration information, the state of the common flag is caused to transition to "No." Also, in the case where at least one of the beacons received from the multiple wireless base stations AP does not include configuration information, the state of the common flag is caused to transition to "No" or to "Unknown."

That is, only in the case where the beacons from all wireless base stations AP include configuration information and where the sets of configuration information from all wireless base stations AP are the same as the own configuration information, is the state of the common flag caused to transition to "Yes."

In the AP scan phase, as described above, each wireless base station AP updates the common flag in the common configuration information list it retains on the basis of the configuration information included in the beacons from the other wireless base stations AP. In this manner, the same common configuration information list is retained by the wireless base stations AP.

(Details of the Multiplexing Information Negotiation Phase)

Next, the multiplexing information negotiation phase in FIG. 8 is explained below in detail with reference to FIGS. 11 to 15.

Figure 11:
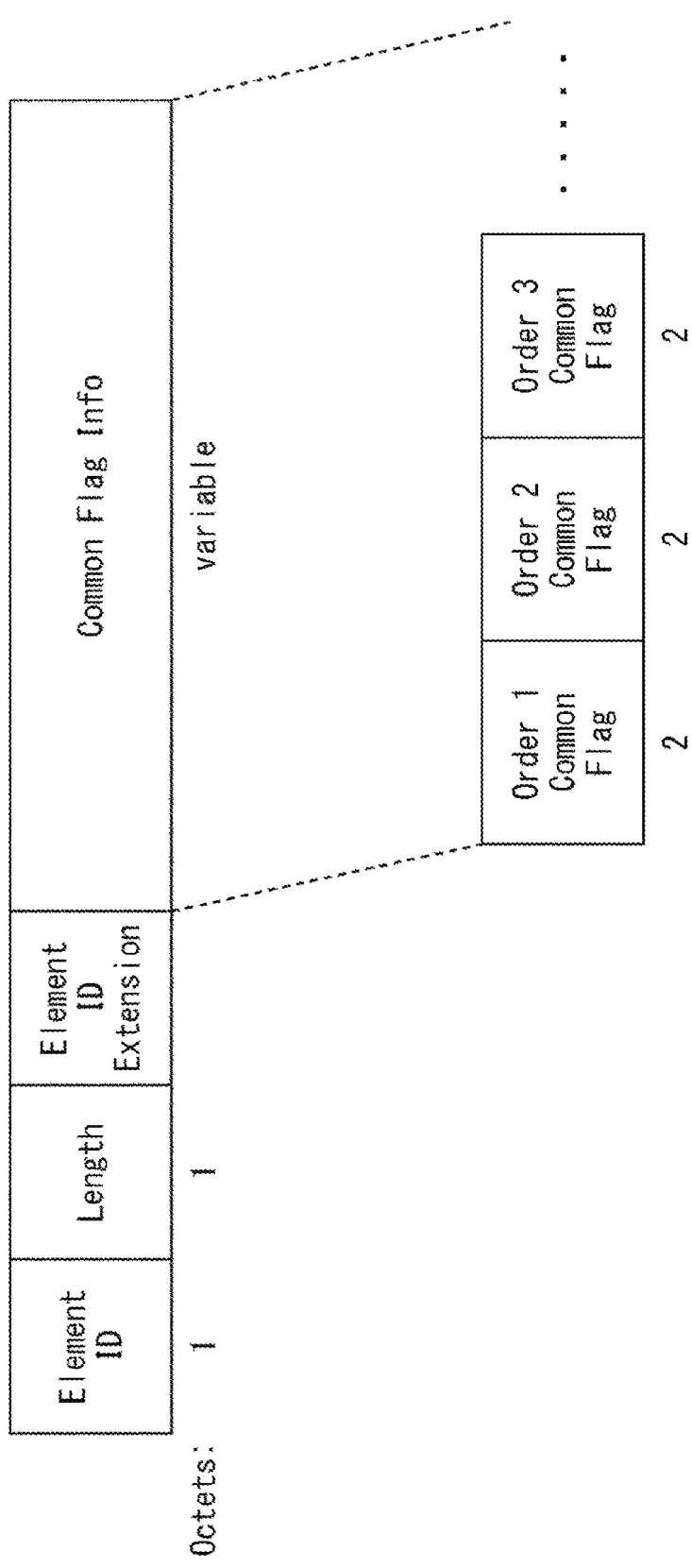
FIG. 11 is a view depicting a typical format of a multiplexing information frame.

FIG. 11 depicts a typical format of the multiplexing information frame.

Here in FIG. 11, the multiplexing information frame is based on the frame format called the element stipulated by the IEEE 802.11 standard. However, this is not limitative of the format of the multiplexing information frame. Incidentally, the frame format depicted in FIG. 11 includes a multiplexing information element (AP multiplexing information element) and is thus called the multiplexing information frame here.

In FIG. 11, the multiplexing information frame includes Element ID, Length, Element ID Extension, and Common Flag Info fields.

The Element ID stores identification information indicating that this element is the multiplexing information element. The Length stores information regarding the length of the frame. The Element ID Extension stores extension information regarding the element.

The Common Flag Info stores common flag information including the state of the common flag for each configuration information. Here, the common flag information indicates whether or not the configuration information regarding the own wireless base station AP has a commonality with another wireless base station AP. The common flag information is used as sharing verification information for ascertaining whether or not the same common configuration information list is retained, and thus shared, by the wireless base stations AP.

The common flag information represents the state of the common flag for each configuration information (e.g., "Yes," "No," and "Unknown") using two bits assigned to each configuration information. Here in the common flag information, the state of the common flag for each configuration information is determined by information regarding the configuration information from the other wireless base station AP, i.e., by the common flag information included in the configuration information or in the multiplexing information frame in the beacon from the other wireless base station AP.

Also, the Order number stipulated by the IEEE 802.11 standard, for example, may be used here to define the order of the configuration information arranged in the Common Flag Info. Specifically, as depicted in the above-described FIG. 7, Order number 1 stands for Timestamp, Order number 2 for Beacon interval, and Order number 3 for Capability Information. Likewise, Order numbers 4, 5, 6, . . . denote SSID, Supported Rates and BSS Membership Selectors, DSSS Parameter Set, . . . , respectively.

In this manner, the Common Flag Info has Order 1 Common Flag, Order 2 Common Flag, Order 3 Common Flag, . . . as two-bit Common Flags, arranged in sequence. For example, Order 1 Common Flag denotes the state of the common flag of Timestamp, Order 2 Common Flag represents the state of the common flag of Beacon interval, and Order 3 Common Flag stands for the state of the common flag of Capability Information.

Note that, in the description that follows, the common flag (Order Common Flag) included in the common flag information (Common Flag Info) may be referred to as the order common flag so as to be distinguished from the common flag included in the above-described common flag information list.

In the multiplexing information negotiation phase, the multiplexing information frame structured as described above is exchanged between the wireless base stations AP.

FIG. 12 is a flowchart explaining a flow of the multiplexing information negotiation phase performed by the communication apparatus 10 serving as the wireless base station AP.

In step S201, the reception section 105 receives a multiplexing information frame sent from another wireless base station AP. This allows the control section 101 to acquire the common flag information (Common Flag Info) included in the multiplexing information frame.

In step S202, the control section 101 determines whether or not the information (state of the Order Common Flag) in the acquired common flag information (Common Flag Info) matches with the information (state of the Order Common Flag) in the own common configuration information list retained by the own wireless base station AP.

In the case where it is determined in step S202 that the two sets of information match with each other, control is transferred to step S203. In step S203, the transmission section 104 waits for a randomly determined period of time so that an upcoming notification will not conflict with that of any other wireless base station AP, before transmitting Ack to the other wireless base station that is the transmission source.

That is, in this case, the same common configuration information list is retained by the wireless base stations AP in the AP scan phase, so that there is no need to update the common configuration information list.

On the other hand, in the case where it is determined in step S202 that the two sets of information fail to match with each other, control is transferred to step S204. In step S204, given the sets of configuration information in the common flag information list, the control section 101 extracts each configuration information whose state of the common flag fails to match with the state of the order common flag in the common flag information.

In step S205, the control section 101 updates the common flag for each extracted configuration information out of the sets of configuration information in the common configuration information list.

In the case here in which, for example, the states (e.g., "Yes," "No," and "Unknown") of the order common flags in the common flag information included in the multiplexing information frame received from the other wireless base station AP fail to match with the states (e.g., "Yes," "No," and "Unknown") of the common flags in various kinds of configuration information (e.g., Timestamp and Beacon interval) in the common configuration information list retained by the own wireless base station AP (for example, even in the case of a single mismatch), the unmatched states of the common flags (e.g., "Yes," "No," and "Unknown") are updated in the common configuration information list.

In step S206, the transmission section 104 waits for a randomly determined period of time so that an upcoming notification will not conflict with that of any other wireless base station AP, before transmitting a multiplexing information frame to the other wireless base station that is the transmission source. Here, the multiplexing information frame including the common flag information reflecting the content of the updated common configuration information list is generated and transmitted.

In other words, the communication apparatus 10 acting as the (own) wireless base station AP acquires information regarding the configuration information (the configuration information included in the beacon, or the common flag information included in the multiplexing information frame) from another wireless base station AP. On the basis of the acquired information, the communication apparatus 10 generates the multiplexing information frame including the common flag information as the sharing verification information indicating whether or not the configuration information regarding the own wireless base station AP has a commonality with the other wireless base station AP. The multiplexing information frame thus generated is transmitted to the other wireless base station AP.

That is, in this case, it is possible to detect and correct differences between the different common configuration information lists generated by the wireless base stations AP at the time of the AP scan phase.

Upon completion of the processing of step S203 or step S206, the process of the multiplexing information negotiation phase indicated in FIG. 12 is terminated.

Figure 13:
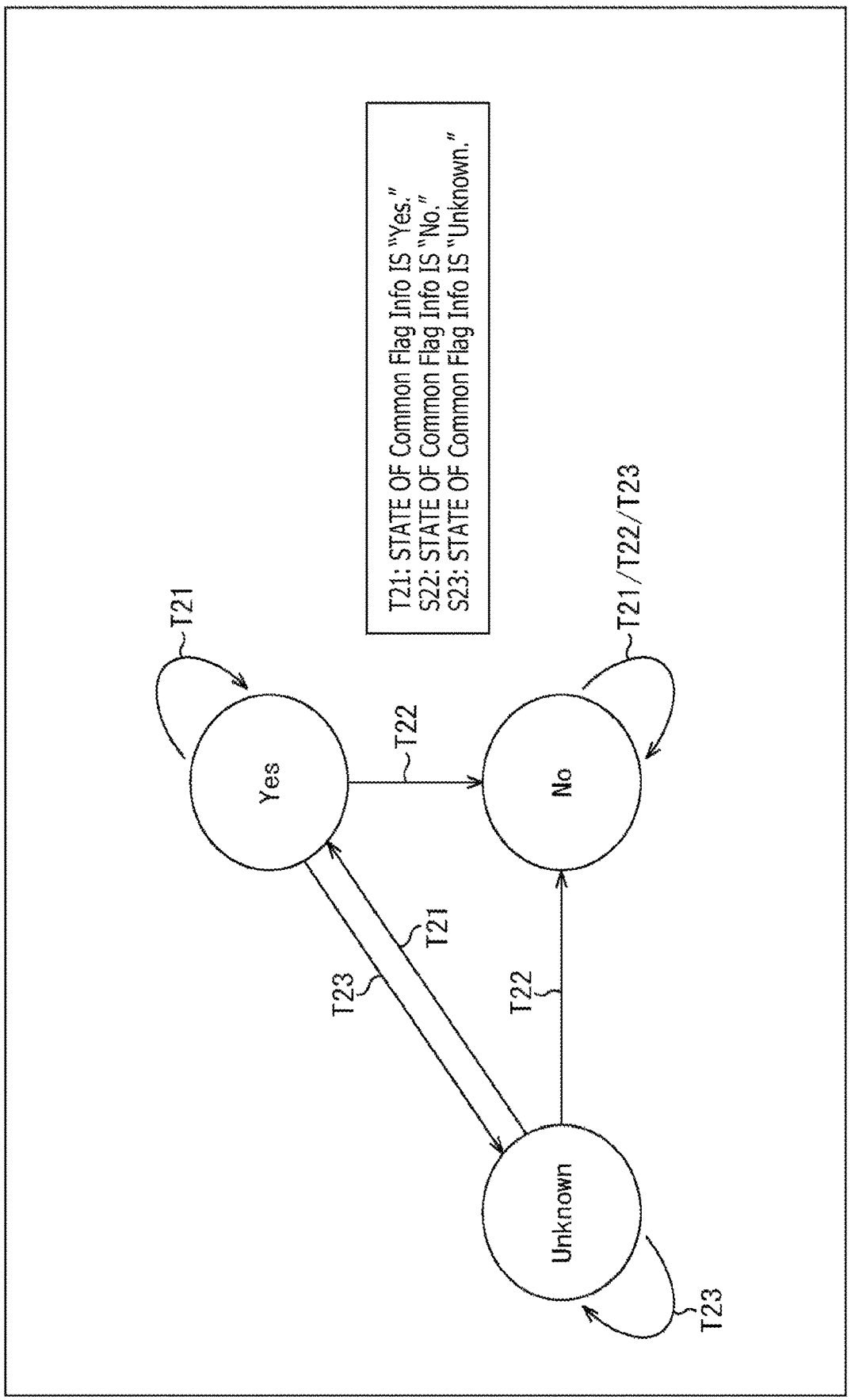
FIG. 13 is a state transition diagram of the common flag in the multiplexing information negotiation phase.

FIG. 13 is a state transition diagram of the common flag in the multiplexing information negotiation phase.

In the multiplexing information negotiation phase, it is assumed that the two-bit common flag represents three states, i.e., "Yes," "No," and "Unknown." That is, compared with the AP scan phase, the common flag in the multiplexing information negotiation phase excludes the state of "Initial," i.e., the initial state.

First, in the case where the state of the common flag in the common configuration information list is "Yes" and where the state of the order common flag in the common flag information (Common Flag Info) included in the multiplexing information frame from another wireless base station AP is "Yes," the state of the common flag in the common configuration information list remains "Yes" (T21 indicated by an arrow originating from a circle "Yes" in the drawing).

In the case where the state of the common flag in the common configuration information list is "Yes" and where the state of the order common flag in the common flag information is "No," the state of the common flag in the common configuration information list transitions from "Yes" to "No" (T22 indicated by an arrow originating from the circle "Yes" in the drawing). Further, in the case where the state of the common flag in the common configuration information list is "Yes" and where the state of the order common flag in the common flag information is "Unknown," the state of the common flag in the common configuration information list transitions from "Yes" to "Unknown" (T23 indicated by an arrow originating from the circle "Yes" in the drawing).

Second, in the case where the state of the common flag in the common configuration information list is "No" and where the state of the order common flag in the common flag information is "Yes," "No," or "Unknown," the state of the common flag in the common configuration information list remains "No" (T21, T22, or T23 indicated by an arrow originating from a circle "No" in the drawing).

Third, in the case where the state of the common flag in the common configuration information list is "Unknown" and where the state of the order common flag in the common flag information is "Yes," the state of the common flag in the common configuration information list transitions from "Unknown" to "Yes" (T21 indicated by an arrow originating from a circle "Unknown" in the drawing).

Also, in the case where the state of the common flag in the common configuration information list is "Unknown" and where the state of the order common flag in the common flag information is "No," the state of the common flag in the common configuration information list transitions from "Unknown" to "No" (T22 indicated by an arrow originating from the circle "Unknown" in the drawing). Further, in the case where the state of the common flag in the common configuration information list is "Unknown" and where the state of the order common flag in the common flag information is "Unknown," the state of the common flag in the common configuration information list remains "Unknown" (T23 indicated by an arrow originating from the circle "Unknown" in the drawing).

As described above, even in the case where the state of the common flag in the common configuration information list is "Unknown" in the AP scan phase, for example, if the state of the order common flag in the common flag information is "Yes" or "No" in the multiplexing information negotiation phase, the state of the common flag in the common configuration information list can be caused to transition from "Unknown" to "Yes" or to "No" for correction.

Figure 14:
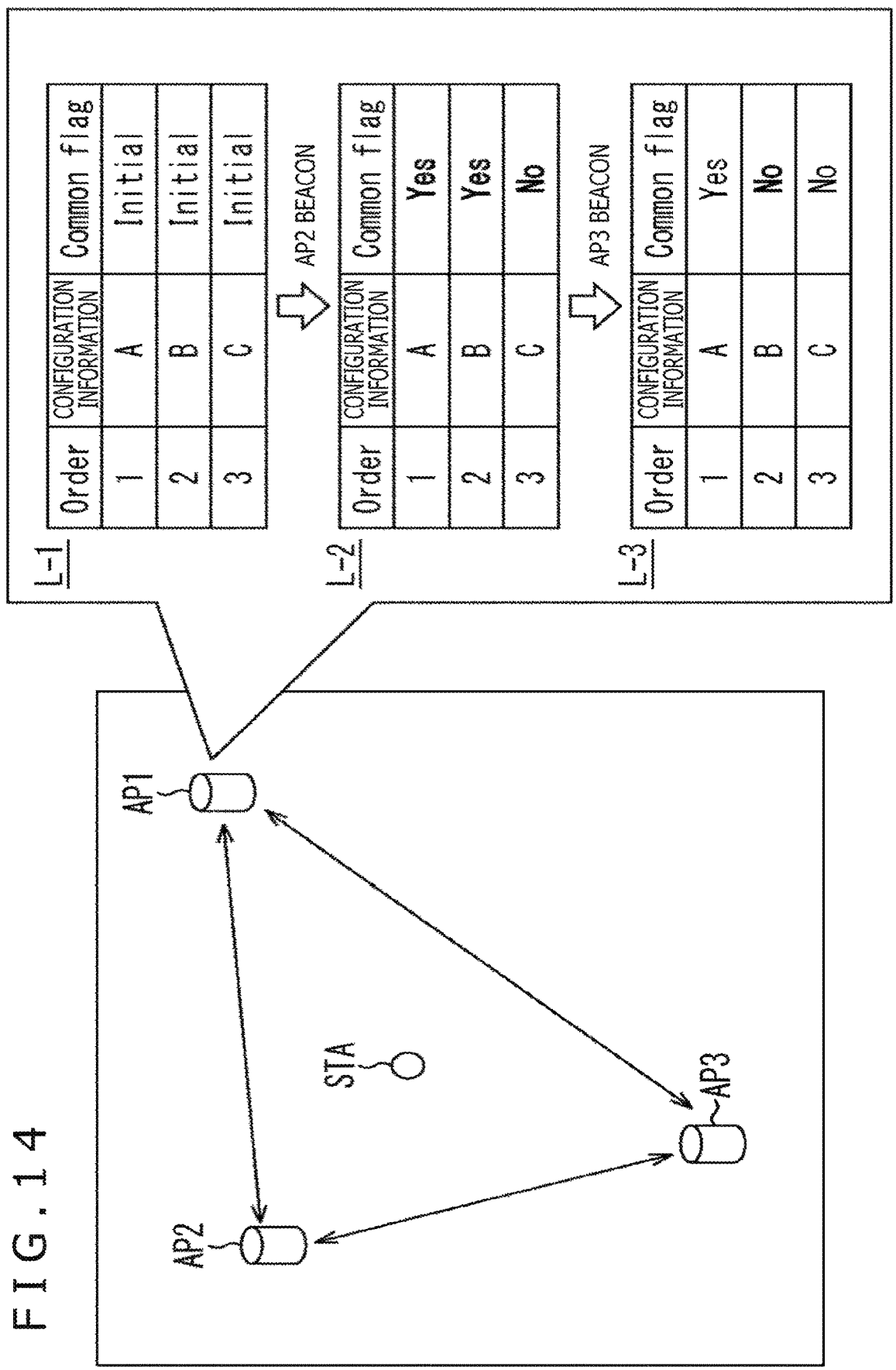
FIG. 14 is a view depicting a first example of sharing the common configuration information list.

FIG. 14 is a view depicting a first example of sharing the common configuration information list.

FIG. 14 depicts an example in which the wireless base stations AP1, AP2, and AP3 share the common configuration information list. It is assumed here that configuration information A and configuration information B has a commonality with the wireless base stations AP1 and AP2, that configuration information A and configuration information C has a commonality with the wireless base stations AP2 and AP3, and that configuration information A and configuration information C has a commonality with the wireless base stations AP1 and AP3.

First, the wireless base station AP1 retains a common configuration information list L-1 in which the state of the common flag is "Initial" for the configuration information A, B, and C.

At this time, the wireless base station AP2 transmits a beacon. Upon receipt of the beacon, the wireless base station AP1 updates the state of the common flag for the configuration information A, B, and C to "Yes," "Yes," and "No," respectively, in a common configuration information list L-2 because the configuration information A and configuration information B has a commonality with the wireless base stations AP1 and AP2.

Thereafter, the wireless base station AP3 transmits a beacon. Upon receipt of the beacon, the wireless base station AP1 updates the state of the common flag for the configuration information B from "Yes" to "No" in a common configuration information list L-3 because the configuration information A and configuration information C has a commonality with the wireless base stations AP1 and AP3.

As described above, with the beacons exchanged between the wireless base stations AP in the AP scan phase, each wireless base station updates the common configuration information list it retains. Thus, the same common configuration information list is retained by the wireless base stations AP.

Figure 15:
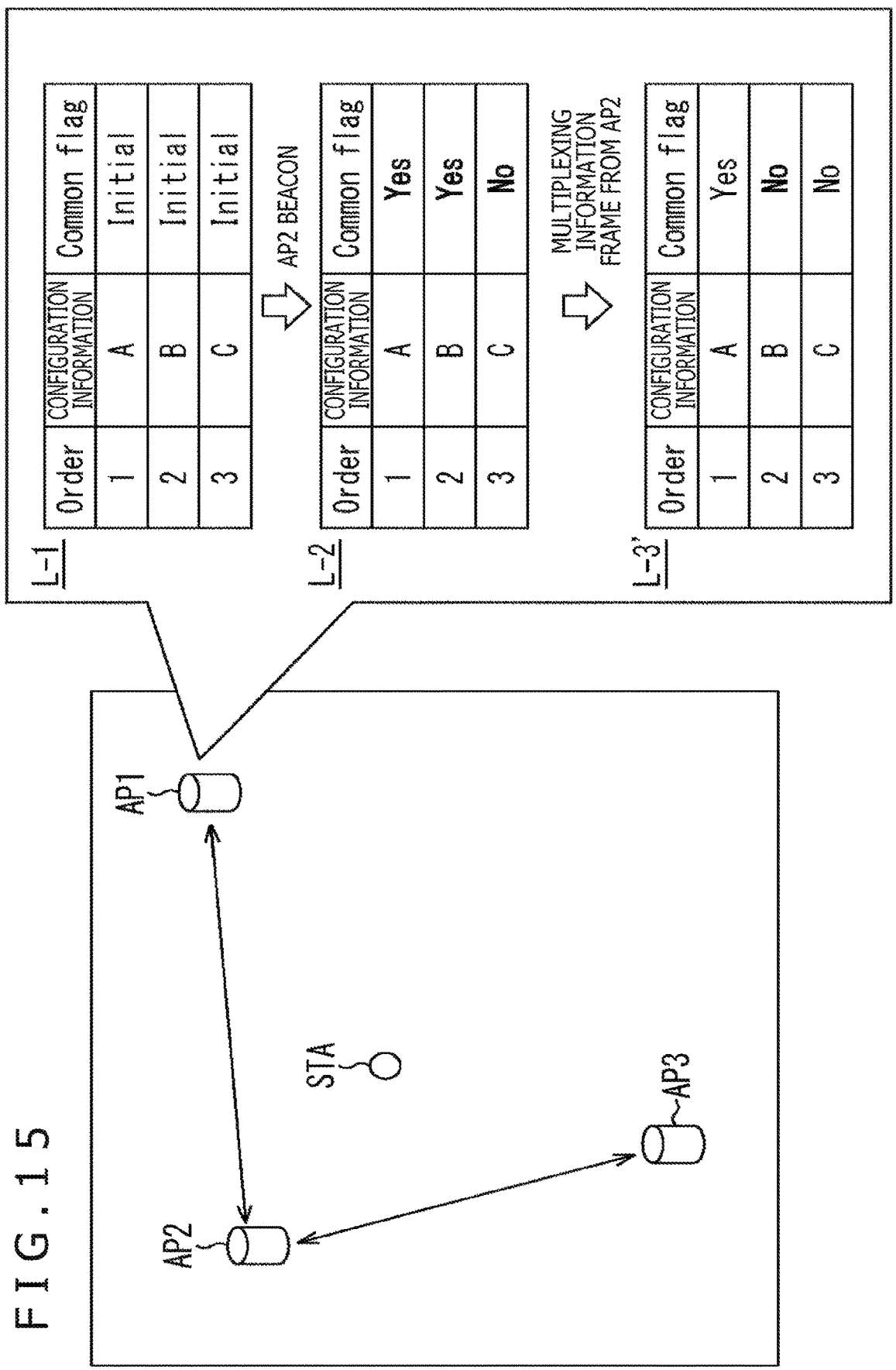
FIG. 15 is a view depicting a second example of sharing the common configuration information list.

FIG. 15 is a view depicting a second example of sharing the common configuration information list.

It is assumed in the sharing example of FIG. 15 that, unlike in the above-described sharing example of FIG. 14, the wireless base station AP1 has failed to receive a beacon sent from the wireless base station AP3 in the AP scan phase.

In this case, upon receipt of the beacon from the wireless base station AP2 in the AP scan phase, the wireless base station AP1 updates the common flag for the configuration information A, B, and C from the initial state to "Yes," "Yes" and "No," respectively, in the common configuration information list L-2.

Thereafter, in the multiplexing information negotiation phase, the wireless base station AP2 transmits a multiplexing information frame. At this time, the wireless base station AP1 receives the multiplexing information frame from the wireless base station AP2 and, based on the order common flag in the common flag information obtained from the frame, updates the state of the common flag for the configuration information B from "Yes" to "No" as the common configuration information list L-3'.

As described above, even in the case where the wireless base station AP1 fails to receive the beacon from the wireless base station AP3 in the AP scan phase, the wireless base station AP2 has received the beacon from the wireless base station AP3. Thus, in the multiplexing information negotiation phase, the wireless base station AP1 can correct the common configuration information list by receiving the multiplexing information frame from the wireless base station AP2. This allows the same common configuration information list to be retained by the wireless base stations AP1, AP2, and AP3.

As described above, in the case where the same common configuration information list is not retained by the wireless base stations AP in the AP scan phase, the common configuration information list is corrected by use of the multiplexing information frame in the multiplexing information negotiation phase. This enables the wireless base stations AP to retain the same common configuration information list.

(Details of the STA Scan Phase)

Next, the STA scan phase in FIG. 8 is explained below in detail with reference to FIGS. 16 to 19.

In the case where the active scan method is adopted for using wireless LAN services, the wireless terminal STA transmits a probe request to the wireless base stations AP. According to the present technology, the probe request together with trigger information (trigger-carrying probe request) is transmitted.

Figure 16:
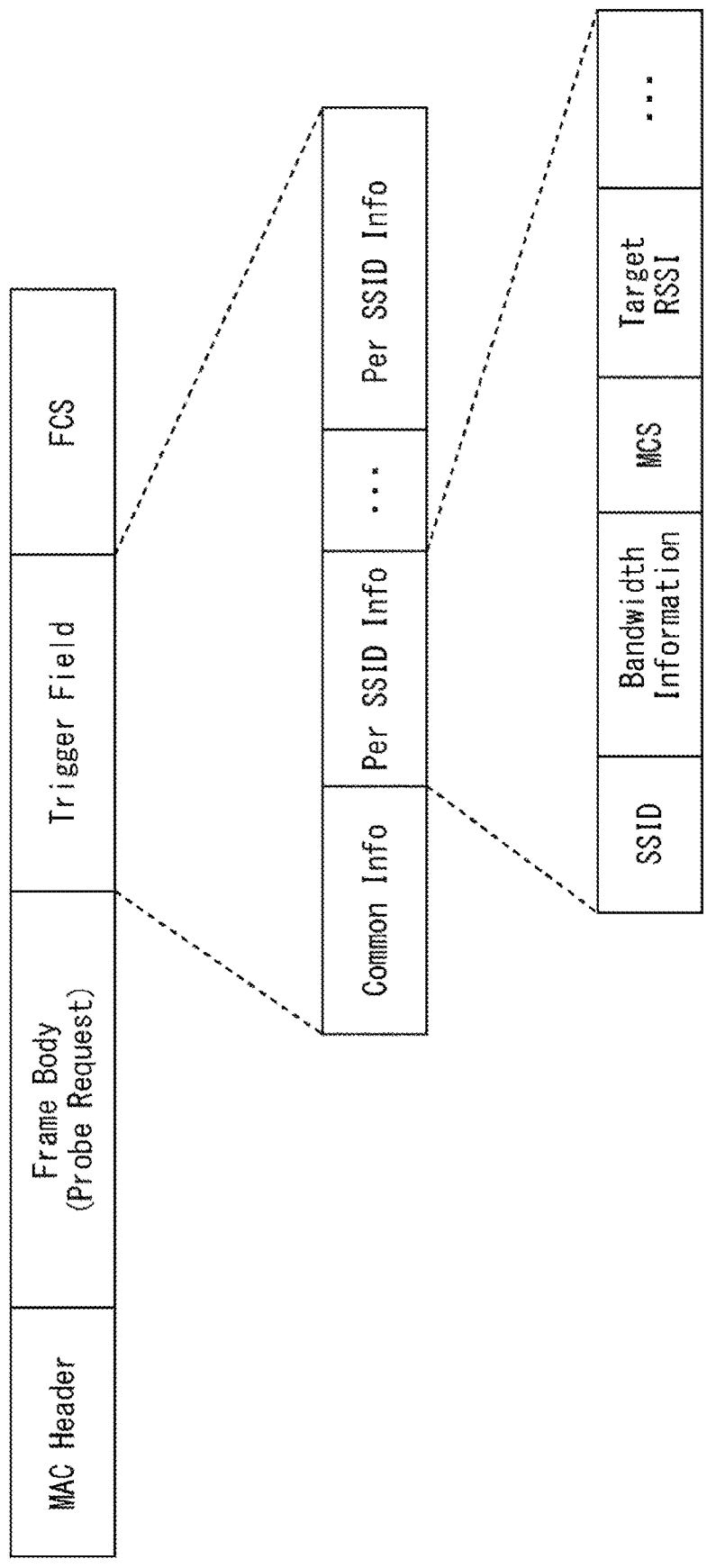
FIG. 16 is a view depicting a typical format of a probe trigger frame.

FIG. 16 depicts a typical format of a frame that holds the trigger-carrying probe request (probe trigger frame).

In FIG. 16, the probe trigger frame includes MAC Header, Frame Body, Trigger Field, and FCS. The MAC Header is the header of the MAC layer. The Frame Body stores the probe request. The FCS (Frame Check Sequence) stores information regarding error detection and correction.

The probe trigger frame includes trigger information stored in the Trigger Field in addition to the probe request stored in the Frame Body. The Trigger Field includes Common Info and Per SSID Info as the trigger information. The Common Info stores the time until response and STA information, among others.

The Per SSID Info refers to information for each SSID to which a multiplexed probe response is to be transmitted, and includes SSID, Bandwidth Information, MCS, and Target RSSI, for example. These sets of information represent information related to multiplexing of probe responses (multiplexing information). The information can indicate whether or not multiplexing is available by means of the presence or absence of the information for each SSID.

The SSID stores information for identifying the wireless base station AP. The Bandwidth Information stores bandwidth information regarding the frequency band in which multiplexed probe responses are to be transmitted. The MCS (Modulation and Coding Scheme) stores information that indexes spatial streams by a modulation method or by an encoding rate. The Target RSSI (Received Signal Strength Indication) stores information regarding a received signal strength.

In the STA scan phase, the probe trigger frame structured as described above is transmitted from the wireless terminal STA to the wireless base stations AP in the vicinity. Upon receipt of the trigger-carrying probe request, each of the wireless base stations AP transmits a probe response to the wireless terminal STA. According to the present technology, what is transmitted here is a probe response in which the probe responses transmitted in the wide band and in the narrow band are multiplexed (i.e., multiplexed probe response).

Figure 17:
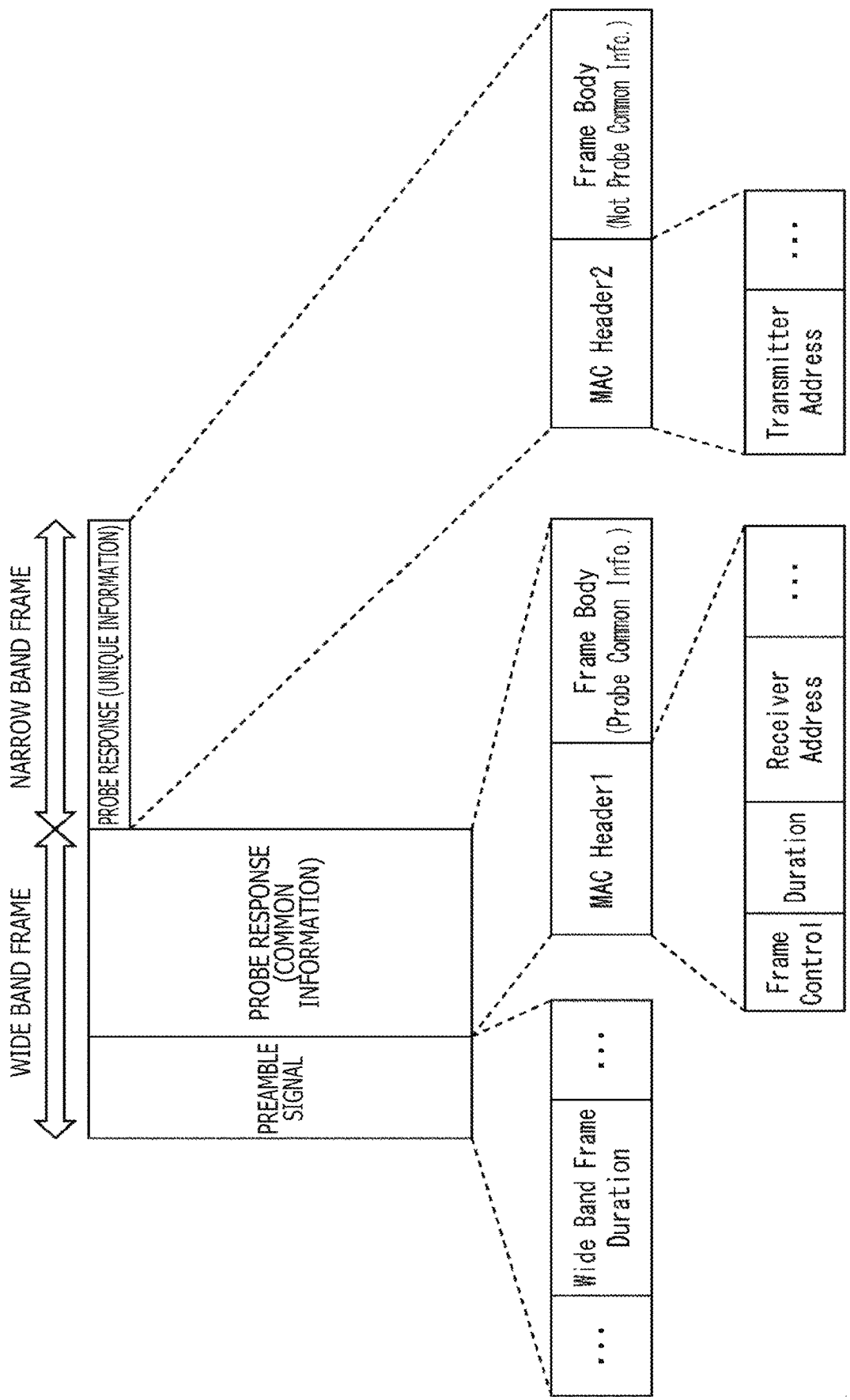
FIG. 17 is a view depicting a typical format of a probe response multiplexed frame.

FIG. 17 depicts a typical format of a frame that holds a multiplexed probe response (i.e., probe response multiplexed frame).

In FIG. 17, the probe response multiplexed frame includes a wide band frame and a narrow band frame. Here, the frame having a preamble signal and a probe response including shared information is referred to as the wide band frame, and the frame having a probe response including unique information (information other than the shared information) is referred to as the narrow band frame. Note that the relations between the wide band as the first band and the narrow band as the second band have already been discussed earlier.

In the wide band frame, the preamble signal includes a Wide Band Frame Duration field. The Wide Band Frame Duration stores wide band frame duration information. The wide band frame duration information relates to the length of the wide band frame, designating the time in which transmission is performed by use of the wide band frame.

That is, upon receipt of the probe response multiplexed frame, the wireless terminal STA can recognize (detect) where transmission of the narrow band frame starts (i.e., boundary (break) between the wide band frame and the narrow band frame) on the basis of the wide band frame duration information included in the preamble signal.

Also in the wide band frame, the probe response includes MAC Header 1 and Frame Body fields. The MAC Header 1 is the header of the MAC layer and includes Frame Control, Duration, and Receiver Address fields, for example.

The Frame Control stores information regarding the type and destination of the probe response multiplexed frame. The Duration stores information regarding the length of the probe response multiplexed frame (time for transmission). That is, upon receipt of the probe response multiplexed frame, the wireless terminal STA can recognize the total length of the probe response multiplexed frame (i.e., end of (the narrow band frame of) the probe response multiplexed frame) on the basis of the duration information in the MAC Header 1. The Receiver Address stores information regarding the address of the transmission destination (wireless terminal STA) of the probe response multiplexed frame.

Incidentally, the Frame Control, Duration, and Receiver Address constitute an example of the MAC Header 1. Alternatively, the MAC Header 1 may include header information common to the other wireless base stations AP (e.g., wireless base stations AP2 and AP3) in the vicinity of the own wireless base station AP (e.g., wireless base station AP1).

In the wide band frame, the Frame Body (Probe Common Info.) in the probe response stores shared information as the information (probe response) transmitted by use of the wide band frame. For example, the shared information as part of the configuration information has a commonality with the other wireless base stations AP (e.g., wireless base stations AP2 and AP3) in the vicinity of the own wireless base station AP (e.g., wireless base station AP1).

In the narrow band frame, the probe response includes MAC Header 2 and Frame Body fields, for example. The MAC Header 2 is the header of the MAC layer and includes a Transmitter Address field. The Transmitter Address stores information regarding the address of the transmission source of this frame.

Note that the Transmitter Address is an example of the MAC Header 2. The Transmitter Address may include header information that is different from (not common to) that of the other wireless base stations AP (e.g., wireless base stations AP2 and AP3) in the vicinity of the own wireless base station AP (e.g., wireless base station AP1).

In the narrow band frame, the Frame Body (Not Probe Common Info.) in the probe response stores unique information as the information transmitted by use of the narrow band frame (probe response). For example, the unique information as part of the configuration information is different from (not common to) the other wireless base stations AP (e.g., wireless base stations AP2 and AP3) in the vicinity of the own wireless base station AP (e.g., wireless base station AP1).

Note that, with respect to the frame structure in FIG. 17, it has been explained above that where the transmission of the narrow band frame starts is recognized on the basis of the wide band frame duration information included in the preamble signal. Here, it is sufficient if the break between the wide band frame and the narrow band frame can be recognized. For example, a Length (bit count) field may be used in place of the Duration (time).

Figure 18:
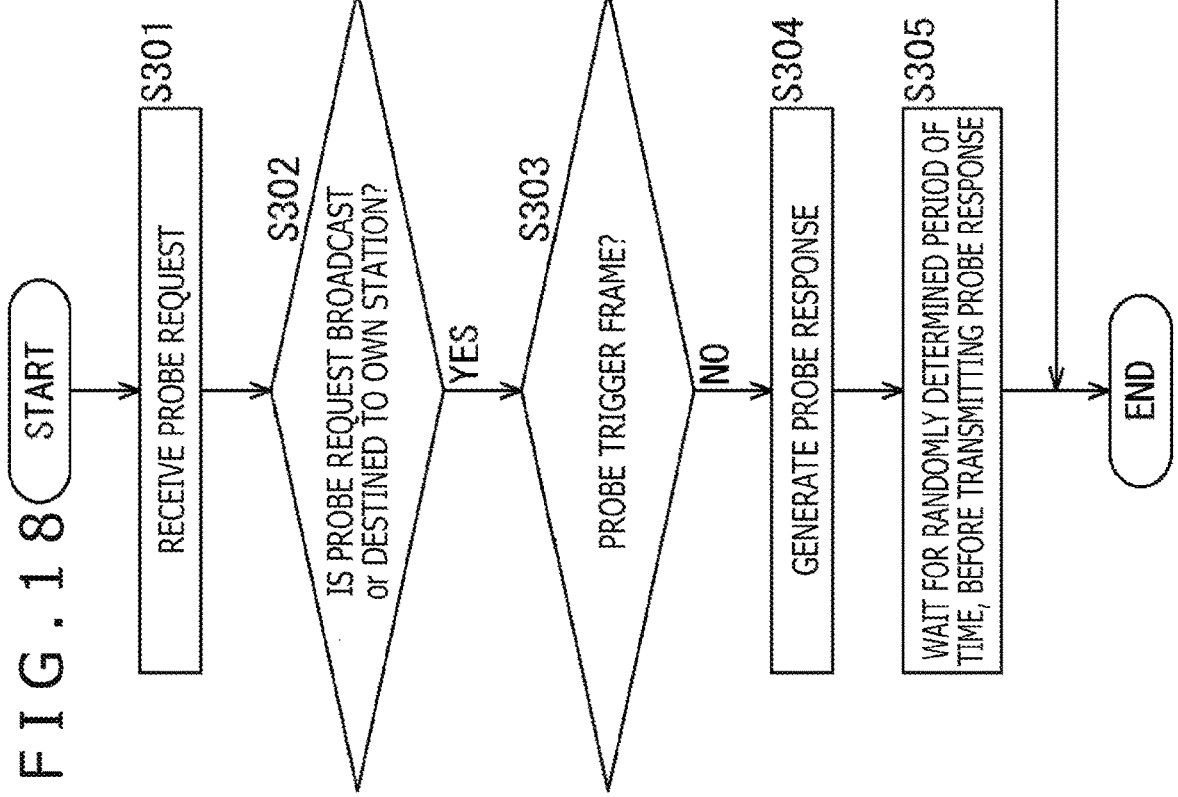
FIG. 18 is a flowchart explaining a flow of a STA scan phase.

FIG. 18 is a flowchart explaining a process flow of the STA scan phase performed by the communication apparatus 10 serving as the wireless base station AP.

In step S301, the reception section 105 receives a probe request transmitted from the wireless terminal STA.

In step S302, the control section 101 analyzes the received probe request and determines whether the probe request is broadcast or destined to the own wireless base station.

In the case where it is determined in step S302 that the probe request is broadcast or destined to the own wireless base station, control is transferred to step S303. In step S303, the control section 101 determines whether or not the received probe request is a probe trigger frame.

In the case where it is determined in step S303 that the frame is not the probe trigger frame, the received probe request is handled as the current probe request. Control is then transferred to step S304.

In step S304, the control section 101 generates a probe response in reply to the received current probe request.

In step S305, the transmission section 104 waits for a randomly determined period of time to avoid conflicting with a response from any other wireless base station AP, before transmitting the generated probe response to the wireless terminal STA.

On the other hand, in the case where it is determined in step S303 that the frame is the probe trigger frame, control is transferred to step S306. In step S306, the control section 101 determines whether or not the Trigger Field in the probe trigger frame stores trigger information destined to the own SSID.

In the case where it is determined in step S306 that the Trigger Field stores the trigger information destined to the own SSID, the received probe request is the trigger-carrying probe request and is destined to the own wireless base station. Then, control is transferred to step S307.

In step S307, the control section 101 generates a multiplexed probe response in reply to the received trigger-carrying probe request. Note that the process of generating the multiplexed probe response will be discussed later in detail with reference to the flowchart of FIG. 19.

In step S308, the transmission section 104 waits for a predetermined period of time to avoid conflicting with a response from any other wireless base station AP, before transmitting the generated multiplexed probe response to the wireless terminal STA.

Note that, when the multiplexed probe response is to be transmitted, the transmission parameters such as the frequency band to be used and the transmission power are determined on the basis of the bandwidth information stored in the Bandwidth Information and of the information regarding the received signal strength stored in the Target RSSI from among the trigger information stored in the Trigger Field of the probe trigger frame and destined to the own SSID.

Upon completion of the processing of step S305 or step S308, the process of executing the STA scan phase depicted in FIG. 18 is terminated.

Note that, in the case where it is determined in step S302 that the received probe request is neither broadcast nor destined to the own wireless base station ("NO" in S302), or where it is determined in step S306 that the received probe request is the trigger-carrying probe request but does not hold the trigger information destined to the own wireless base station ("NO" in S306), the process depicted in FIG. 18 is terminated without the transmission of a probe response or a multiplexed probe response.

The process of generating the multiplexed probe response corresponding to the processing of step S307 of FIG. 18 is explained below in detail with reference to the flowchart of FIG. 19.

In step S351, the control section 101 reads and acquires the common configuration information list stored in the storage section 102. After acquiring the common configuration information list, the control section 101 performs the processing of steps S352 through S355 to generate a multiplexed probe response.

That is, the control section 101 successively takes one or multiple sets of configuration information requested by the received trigger-carrying probe request as the configuration information of interest and, by referencing the acquired common configuration information list, determines successively whether or not the state of the common flag set in each configuration information of interest is "Yes" (S352 and S353).

Of the sets of configuration information of interest in the common configuration information list, those with the state of the common flag determined to be "Yes" are stored as common information into the Frame Body (Probe Common Info.) in the wide band frame of the probe response multiplexed frame (S354). The sets of configuration information of interest having the state of the common flag determined to be other than "Yes" (e.g., "No" or "Unknown") are stored as unique information into the Frame Body (Not Probe Common Info.) in the narrow band frame (S355). This is how the multiplexed probe response is generated.

After the multiplexed probe response is generated as described above, control is returned to step S307 in FIG. 18. Step S307 and subsequent steps are then repeated.

In the STA scan phase, as described above, when the wireless terminal STA has its power turned on, for example, the wireless terminal STA transmits the trigger-carrying probe request to each of the wireless base stations AP in the vicinity. The wireless terminal STA then receives multiplexed probe responses from the wireless base stations AP in the vicinity.

The multiplexed probe response is transmitted by multiplex communication in which the configuration information requested by the trigger-carrying probe request comes in two groups, i.e., common information common to the wireless base stations AP in the vicinity and unique information not common thereto. Thus, even in the case where the active scan method is adopted for using wireless LAN services, the time required for active scans is shortened. This makes it possible to perform handover at higher speeds when the wireless terminal STA switches wireless base stations AP while on the move, for example.

2. Alternative Example

It has been explained above that in the communication apparatus 10 (FIG. 2), the control section 101 (FIG. 2) performs control to implement highly efficient active scans by transmitting the multiplexed probe response on the basis of the shared common configuration information list. Alternatively, this control function may be taken over by the control section or the communication section included in a communication module or in a communication chip (communication apparatus).

It has been also explained above that frequency multiplexing is carried out at the time of multiplexing the probe response. Alternatively, some other suitable multiplexing method may be adopted. It has been further explained above that the common information is transmitted by use of the wide band as the first band while the unique information is transmitted by use of the narrow band as the second band. Alternatively, some other band such as an intermediate band (middle band) may be utilized as a third band between the first band and the second band. This can address a variety of operation modes such as where a low band is assigned to wireless base stations AP with low priority whereas the middle band is assigned to other wireless base stations AP with high priority.

Note that the wireless terminal STA as the communication apparatus 10 may be configured as an electronic device having wireless communication capability, such as a smartphone, a tablet terminal, a mobile phone, a personal computer, a digital camera, a game console, a TV set, a wearable terminal, or a speaker device. Alternatively, the communication apparatus 10 may be configured as part of an apparatus constituting the wireless base station AP or the wireless terminal STA (e.g., a communication module or a communication chip). That is, examples of the communication apparatus 10 not only include an electronic device but also the communication module or communication chip (in this case, the communication apparatus 10 does not include the antenna 107).

The communication as understood in the foregoing description is not only wireless communication but also a type of communication in which wireless communication and wired communication coexist, i.e., in which wireless communication is performed over a certain segment while wired communication is implemented over another segment. As another alternative, the communication may be a type of communication in which wired communication is implemented from a first apparatus to a second apparatus while wireless communication is performed from the second apparatus to the first apparatus.

Note that the present technology is not limited to the preferred embodiment discussed above and may be implemented in diverse variations so far as they are within the scope of this technology.

The present technology may be implemented preferably in the following configurations:

(1)

A communication apparatus acting as a wireless base station, including:

a control section configured to acquire, from another wireless base station, information related to configuration information regarding the other wireless base station, in which on the basis of the information related to the configuration information regarding the other wireless base station, the control section performs control to generate sharing verification information indicating whether or not the configuration information regarding the other wireless base station has a commonality with the wireless base station, and the control section performs control to transmit the sharing verification information to the other wireless base station.

(2)

The communication apparatus as stated in (1) above, in which the control section performs control to generate common configuration information determination information for determining whether or not the configuration information regarding the other wireless base station has a commonality with the wireless base station with respect to each configuration information regarding the wireless base station included in a response signal responding to a request signal from a wireless terminal, and the control section performs control to update the common configuration information determination information on the basis of the sharing verification information transmitted from the other wireless base station.

(3)

The communication apparatus as stated in (2) above, in which in a case where the configuration information regarding the other wireless base station included in the sharing verification information is different from the configuration information regarding the wireless base station included in the common configuration information determination information, the control section updates information related to the configuration information regarding the wireless base station included in the common configuration information determination information.

(4)

The communication apparatus as stated in (2) or (3) above, in which in a case where the common configuration information determination information is updated, the control section performs control to generate the sharing verification information in such a manner as to reflect content of the updated common configuration information determination information, and the control section performs control to transmit the generated sharing verification information to the other wireless base station.

(5)

The communication apparatus as stated in any one of (2) to (4) above, in which on the basis of the common configuration information determination information, the control section performs control to multiplex the response signal including the configuration information regarding the wireless base station with the response signal including the configuration information regarding the other wireless base station transmitted from the other wireless base station, before transmitting the multiplexed response signal to the wireless terminal.

(6)

The communication apparatus as stated in (5) above, in which the configuration information regarding the wireless base station includes common information common to the configuration information regarding the other wireless base station and unique information unique to the wireless base station, and on the basis of the common configuration information determination information, the control section performs control to transmit the common information in a first band and the unique information in a second band that is narrower than the first band.

(7)

The communication apparatus as stated in (6) above, in which in the first band, the same band is assigned to the wireless base station and to the other wireless base station, and in the second band, a different band is assigned to each of the wireless base station and the other wireless base station.

(8)

The communication apparatus as stated in (6) or (7) above, in which the response signal includes a first frame corresponding to the first band and a second frame corresponding to the second band, and the response signal includes information regarding the length of the first frame and length of the second frame.

(9)

The communication apparatus as stated in (8) above, in which the response signal includes information regarding the time for transmission using the first frame and the time for transmission using the second frame.

(10)

The communication apparatus as stated in (5) above, in which the request signal includes multiplexing information related to multiplexing of the response signal, and the control section performs control to transmit the response signal to the wireless terminal on the basis of the common configuration information determination information and the multiplexing information.

(11)

The communication apparatus as stated in (10) above, in which the multiplexing information includes at least one of information indicating whether or not multiplexing is possible, information regarding a frequency band for transmitting the response signal, information indicating time until the response signal is transmitted, or information regarding a received signal strength.

(12)

The communication apparatus as stated in any one of (2) to (4) above, in which the control section generates the common configuration information determination information on the basis of a notification signal transmitted from the other wireless base station.

(13)

The communication apparatus as stated in (12) above, in which the control section updates the generated common configuration information determination information on the basis of the notification signal transmitted from the other wireless base station.

(14)

The communication apparatus as stated in (13) above, in which the control section updates the information related to the configuration information regarding the wireless base station in the common configuration information determination information, based on the presence or absence of the configuration information regarding the other wireless base station included in the notification signal and on whether or not the configuration information regarding the wireless base station has a commonality with the other wireless base station.

(15)

The communication apparatus as stated in any one of (2) to (14) above, further including:

a storage section configured to store the common configuration information determination information.

(16)

The communication apparatus as stated in (5) above, in which the multiplexing of the response signal includes frequency multiplexing.

(17)

A communication method for use with a communication apparatus of a wireless base station, the communication method including:

causing the communication apparatus to acquire, from another wireless base station, information related to configuration information regarding the other wireless base station;

on the basis of the information related to the configuration information regarding the other wireless base station, causing the communication apparatus to generate sharing verification information indicating whether or not the configuration information regarding the other wireless base station has a commonality with the wireless base station; and causing the communication apparatus to transmit the sharing verification information to the other wireless base station.

(18)

A communication apparatus acting as a wireless terminal, the communication apparatus including:

a control section configured to perform control to transmit a request signal to a wireless base station, the request signal including multiplexing information related to multiplexing of a response signal responding to the request signal.

(19)

The communication apparatus as stated in (18) above, in which the multiplexing information includes at least one of information indicating whether or not multiplexing is possible, information regarding a frequency band for transmitting the response signal, information indicating time until the response signal is transmitted, or information regarding a received signal strength.

(20) A communication method for use with a communication apparatus of a wireless terminal, the communication method including:

causing the communication apparatus to perform control to transmit, to a wireless base station, a request signal including multiplexing information related to multiplexing of a response signal responding to the request signal.

REFERENCE SIGNS LIST

10 Communication apparatus, 101 Control section, 102 Storage section, 103 Data processing section, 104 Transmission section, 105 Reception section, 106 Antenna sharing section, 111 Analog signal conversion section, 112 RF transmission section, 121 RF reception section, AP Wireless base station, STA Wireless terminal

The invention claimed is:

1. A communication apparatus acting as a wireless base station, comprising:
a processor configured to:
acquire, from another wireless base station, information related to configuration information regarding the other wireless base station;
generate sharing verification information based on the information related to the configuration information regarding the other wireless base station, wherein the sharing verification information indicates whether or not the configuration information regarding the other wireless base station has a commonality with configuration information regarding the wireless base station; and
transmit the sharing verification information to the other wireless base station.

2. The communication apparatus according to claim 1, wherein the processor is further configured to:
generate common configuration information determination information to determine whether or not the configuration information regarding the other wireless base station has the commonality with the configuration information regarding the wireless base station, wherein the configuration information regarding the wireless base station is included in a response signal that responds to a request signal from a wireless terminal; and
update the common configuration information determination information on a basis of the configuration information acquired from the other wireless base station.

3. The communication apparatus according to claim 2, wherein the processor is further configured to
update information related to the configuration information regarding the wireless base station included in the common configuration information determination information based on the configuration information regarding the other wireless base station being different from the configuration information regarding the wireless base station.

4. The communication apparatus according to claim 2, wherein
the sharing verification information is generated in such a manner as to reflect content of the updated common configuration information determination information in a case where the common configuration information determination information is updated.

5. The communication apparatus according to claim 2, wherein the processor is further configured to
multiplex the response signal that includes the configuration information regarding the wireless base station with another response signal that includes the configuration information regarding the other wireless base station, on a basis of the common configuration information determination information, before transmitting the response signal to the wireless terminal, wherein the other response signal is transmitted by the other wireless base station.

6. The communication apparatus according to claim 5, wherein
the configuration information regarding the wireless base station includes common information that is common to the configuration information regarding the other wireless base station and unique information that is unique to the wireless base station, and
wherein the processor is further configured to transmit, on a basis of the common configuration information determination information, the common information in a first band and the unique information in a second band that is narrower than the first band.

7. The communication apparatus according to claim 6, wherein
in the first band, a same band is assigned to the wireless base station and to the other wireless base station, and
in the second band, a different band is assigned to each of the wireless base station and the other wireless base station.

8. The communication apparatus according to claim 6, wherein
the response signal includes a first frame corresponding to the first band and a second frame corresponding to the second band, and
the response signal includes information regarding a length of the first frame and a length of the second frame.

9. The communication apparatus according to claim 8, wherein
the response signal includes information regarding time for transmission based on the first frame and time for transmission based on the second frame.

10. The communication apparatus according to claim 5, wherein
the request signal includes multiplexing information that is related to multiplexing of the response signal, and
the processor is further configured to transmit the response signal to the wireless terminal on a basis of the common configuration information determination information and the multiplexing information.

11. The communication apparatus according to claim 10, wherein
the multiplexing information includes at least one of information indicating whether or not multiplexing is possible, information regarding a frequency band for transmitting the response signal, information indicating time until the response signal is transmitted, and information regarding a received signal strength.

12. The communication apparatus according to claim 2, wherein
the common configuration information determination information is generated on a basis of a notification signal transmitted from the other wireless base station.

13. The communication apparatus according to claim 12, wherein
the generated common configuration information determination information is updated on a basis of the notification signal transmitted from the other wireless base station.

14. The communication apparatus according to claim 13, wherein
the information related to the configuration information regarding the wireless base station in the common configuration information determination information is updated based on presence or absence of the configuration information regarding the other wireless base station included in the notification signal and on whether or not the configuration information regarding the wireless base station has the commonality with the configuration information regarding the other wireless base station.

15. The communication apparatus according to claim 2, further comprising:
a memory configured to store the common configuration information determination information.

16. A communication method for communication with a communication apparatus of a wireless base station, the communication method comprising:
acquiring from another wireless base station, information related to configuration information regarding the other wireless base station;
generating sharing verification information based on the information related to the configuration information regarding the other wireless base station, wherein the sharing verification information indicates whether or not the configuration information regarding the other wireless base station has a commonality with configuration information regarding the wireless base station; and
transmitting the sharing verification information to the other wireless base station.

17. A communication apparatus acting as a wireless terminal, the communication apparatus comprising:
a processor configured to:
transmit a request signal to a plurality of wireless base stations, wherein the request signal includes multiplexing information related to multiplexing of response signals, from the plurality of wireless base stations, that respond to the request signal, wherein each response signal, of the response signals, includes configuration information regarding a corresponding wireless base station of the plurality of wireless base stations, wherein the configuration information includes common information and unique information, wherein the common information is common to the configuration information regarding another wireless base station and the unique information is unique to the corresponding wireless base station, and wherein the common information is transmitted in a first band and the unique information is transmitted in a second band that is narrower than the first band.

18. The communication apparatus according to claim 17, wherein
the multiplexing information includes at least one of information regarding a frequency band for transmitting the response signals, information indicating time until the response signals are transmitted, and information regarding a received signal strength.

19. A communication method for communication with a communication apparatus of a wireless terminal, the communication method comprising:
transmitting, to a plurality of wireless base stations, a request signal, wherein the request signal includes multiplexing information related to multiplexing of response signals, from the plurality of wireless base stations, to the request signal, wherein each response signal, of the response signals, includes configuration information regarding a corresponding wireless base station of the plurality of wireless base stations, wherein the configuration information includes common information and unique information, wherein the common information is common to the configuration information regarding another wireless base station and the unique information is unique to the corresponding wireless base station, and wherein the common information is transmitted in a first band and the unique information is transmitted in a second band that is narrower than the first band.

20. The communication apparatus according to claim 17, wherein
the multiplexing information includes information that indicates whether or not multiplexing of the response signals are available.

* * * * *